United States Patent [19]

Okubo

[11] Patent Number: 5,542,387
[45] Date of Patent: Aug. 6, 1996

[54] COMPONENT LAYOUT FOR ENGINE

[75] Inventor: Akihiko Okubo, Iwata, Japan

[73] Assignee: Yamaha Hatsudoki Kabushiki Kaisha, Iwata, Japan

[21] Appl. No.: 287,906

[22] Filed: Aug. 9, 1994

[51] Int. Cl.⁶ .................................................... F02B 75/06
[52] U.S. Cl. ................................ 123/192.2; 123/184.22; 123/195 A; 123/196 R; 123/198 R; 180/297
[58] Field of Search ................................... 180/296, 297; 123/184.22, 179.25, 192.2, 195 A, 196 R, 198 R, 198 C, 41.86

[56] References Cited

U.S. PATENT DOCUMENTS

| | | |
|---|---|---|
| 2,253,152 | 8/1938 | Towler et al. . |
| 2,796,075 | 6/1957 | Focht . |
| 3,302,752 | 2/1967 | Shiokawa . |
| 3,435,612 | 4/1969 | Hensler . |
| 3,447,636 | 6/1969 | Bonfilio . |
| 3,779,225 | 12/1973 | Watson et al. . |
| 3,938,425 | 2/1976 | Kroffke . |
| 4,094,293 | 6/1978 | Evans . |
| 4,199,950 | 4/1980 | Hakanson et al. . |
| 4,369,743 | 1/1983 | Holt et al. . |
| 4,385,614 | 5/1983 | Eheim et al. . |
| 4,396,151 | 8/1983 | Kato et al. . |

(List continued on next page.)

FOREIGN PATENT DOCUMENTS

| | | |
|---|---|---|
| 0275715 | 12/1987 | European Pat. Off. . |
| 0376815 | 12/1989 | European Pat. Off. . |
| 0381162 | 8/1990 | European Pat. Off. . |
| 1400280 | 4/1965 | France . |
| 949855 | 7/1949 | Germany . |
| 2411513 | 9/1975 | Germany . |
| 3025002 | 2/1981 | Germany . |
| 3909772 | 10/1989 | Germany . |
| 0104711 | 2/1923 | Japan . |
| 57-16212 | 1/1982 | Japan . |
| 59-66411 | 6/1984 | Japan . |
| 62-131908 | 6/1987 | Japan . |
| 63-93623 | 4/1988 | Japan ..................................... 180/297 |
| 64-45912 | 2/1989 | Japan . |
| 192505 | 4/1989 | Japan . |
| 2191807 | 7/1990 | Japan . |
| 2118110 | 9/1990 | Japan . |
| 2118111 | 9/1990 | Japan . |
| 2139307 | 11/1990 | Japan . |
| 2151313 | 7/1985 | United Kingdom . |
| 2198191 | 6/1988 | United Kingdom . |

OTHER PUBLICATIONS

1. European Search Report dated Oct. 18, 1993.
2. European Search Report dated Apr. 3, 1993.
3. Patent Abstract of Japan vol. 9, No. 231 (M–414) [1954] 18 Sep. 1985 & JP–A–60 88811 (Sanshin Kogyo K.K.) 18 May 1985 "abstract".
4. European Search Report dated Jun. 24, 1992.
5. Patent Abstracts of Japan, vol. 12, No. 121 (M–686) [2968] 15 Apr. 1988 & JP–A–62–248812 29 Oct. 1987.
6. European Search Report dated Oct. 19, 1992.
7. European Search Report dated Mar. 31, 1993.
8. Patent Abstracts of Japan, vol. 12, No. 121 (M–686) [2968] 15 Apr. 1988 & JP–A–62–248812 (Nippon Soken Inc) 20 Oct. 1987.
9. Patent Abstracts of Japan, vol. 10, No. 204 (M–499) [2260] 17 Jul. 1986 & JP–A–61–46409 (Madza Motor Corp) 6 Mar. 1986.

Primary Examiner—Noah P. Kamen
Attorney, Agent, or Firm—Knobbe, Martens, Olson & Bear

[57] ABSTRACT

A motor vehicle containing a two-cycle, crankcase compression, internal combustion engine having direct lubricating systems for supplying lubricant to the sliding surfaces of the piston and cylinder bore for each cylinder of the engine, separate pumps for delivering lubricant to the crankshaft bearings associated with each cylinder of the engine and a system for delivering lubricant to the engine for the remaining components through the induction system. The accessories for the engine including its induction and exhaust system are laid out so as to facilitate transverse front wheel drive mounting of the engine in the vehicle.

25 Claims, 22 Drawing Sheets

U.S. PATENT DOCUMENTS

| | | |
|---|---|---|
| 4,446,833 | 5/1984 | Matsushita et al. . |
| 4,452,188 | 6/1984 | Kosuda et al. . |
| 4,480,602 | 11/1984 | Kobayashi et al. . |
| 4,502,424 | 3/1985 | Katoh et al. .......................... 123/41.86 |
| 4,506,337 | 3/1985 | Yasuhara . |
| 4,512,298 | 4/1985 | Hayashi . |
| 4,531,485 | 7/1985 | Murther . |
| 4,533,301 | 8/1985 | Foster . |
| 4,539,949 | 9/1985 | Walsworth . |
| 4,551,076 | 11/1985 | DuBois . |
| 4,563,988 | 1/1986 | Weshaupt . |
| 4,655,183 | 4/1987 | Taira et al. . |
| 4,697,553 | 10/1987 | Lie . |
| 4,706,193 | 11/1987 | Imajo et al. . |
| 4,715,791 | 12/1987 | Berlin et al. . |
| 4,726,330 | 2/1988 | Shiga . |
| 4,758,130 | 7/1988 | Waterworth . |
| 4,826,632 | 5/1989 | Abel . |
| 4,829,967 | 5/1989 | Nuti . |
| 4,887,559 | 12/1989 | Hensel et al. . |
| 4,893,598 | 1/1990 | Stasiuk . |
| 4,904,163 | 2/1990 | Tachi et al. . |
| 4,944,658 | 7/1990 | Buttner . |
| 4,967,700 | 11/1990 | Torigai . |
| 4,989,555 | 2/1991 | Matsuo et al. . |
| 5,012,775 | 5/1991 | Oike ..................................... 123/192.2 |
| 5,020,484 | 6/1991 | Ishikawa et al. . |
| 5,052,355 | 10/1991 | Ito et al. ............................. 123/196 R |
| 5,069,177 | 12/1991 | Donokal . |
| 5,094,196 | 3/1992 | Tsurutani et al. . |
| 5,156,120 | 10/1992 | Kent . |
| 5,174,257 | 12/1992 | Ozawa ................................. 123/192.2 |
| 5,195,476 | 3/1993 | Schwarz . |
| 5,197,424 | 3/1993 | Blum . |
| 5,235,944 | 8/1993 | Adachi . |
| 5,287,942 | 2/1994 | Maebayashi et al. .................. 180/297 |

COMPONENT LAYOUT FOR ENGINE

CROSS-REFERENCE TO RELATED APPLICATION

This application is a division of the copending application in which I am a co-inventor with Takehashi Ito, entitled "Lubricating System for Engine," Ser. No. 08/287,660, filed concurrently herewith and assigned to the assignee hereof (Docket No. YAMAH2.682A).

BACKGROUND OF THE INVENTION

This invention relates to a component layout for an engine and more particularly to the layout of the components for a two-cycle crankcase compression engine when employed for empowering a motor vehicle.

There is interest in employing two-cycle crankcase compression internal combustion engines as power plants for motor vehicles. Such engines have certain advantages due to their simplicity and their high specific power output. However, the positioning of such engines in a motor vehicle presents certain problems that are different from those associated with four-cycle engines. Specifically, the induction and exhaust systems for the engine normally communicate with the crankcase chambers rather than with the cylinder head and thus the induction and exhaust systems are positioned differently with two-cycle engines than with four-cycle engines. This gives rise to different problems in component positioning in the vehicle.

In addition to the positioning of the intake and exhaust system, two-cycle crankcase compression engines may employ different accessories or position the accessories different from those associated with four-cycle engines. It is, obviously, important that these components be positioned so that the overall engine compartment is maintained in a simple and accessible fashion.

It is, therefore, a principle object of this invention to provide an improved component layout for a two-cycle crankcase compression engine.

It is a further object of this invention to provide an improved layout for a motor vehicle that is powered by a crankcase compression two-cycle engine.

With two-cycle engines, it is normally the practice to employ a lesser number of cylinders than with four-cycle engines. This is possible because of the more frequent filing impulses of two-cycle engines than with four-cycle engines. As a result, it is often common practice to employ an odd number of cylinders with two-cycle engines. When this is done, there are some advantages in employing a separate balance shaft so as to improve the balancing of the engine. Of course, the positioning of the balance shaft and its driving arrangement must be taken into account when positioning the engine in the vehicle.

It is, therefore, a still further object of this invention to provide an improved component layout for a crankcase compression two-cycle internal combustion engine that employs a balance shaft.

SUMMARY OF THE INVENTION

This invention is adapted to be embodied in a motor vehicle having a body assembly that defines an engine compartment at the forward end thereof. A pair of front wheels are suspended from the body assembly at the front thereof and a pair of rear wheels are suspended by the body assembly at the rear end thereof. A multi-cylinder, in-line, two-cycle crankcase compression, internal combustion engine is supported with a crankshaft rotatable about an axis extending transversely across the engine compartment. A balancer shaft is driven by the engine crankshaft and is rotatable about a balancer shaft axis that is parallel to and which lies beneath the crankshaft axis. The engine has a plurality of exhaust ports on the side of the engine to the front of the engine compartment. An exhaust manifold conveys the exhaust gases from the exhaust ports to an exhaust system that extends in part beneath the engine and the balancer shaft and toward the rear of the vehicle.

DETAILED DESCRIPTION OF THE PREFERRED EMBODIMENT OF THE INVENTION

The Basic Engine Construction (FIGS. 1–12)

Figure 1:
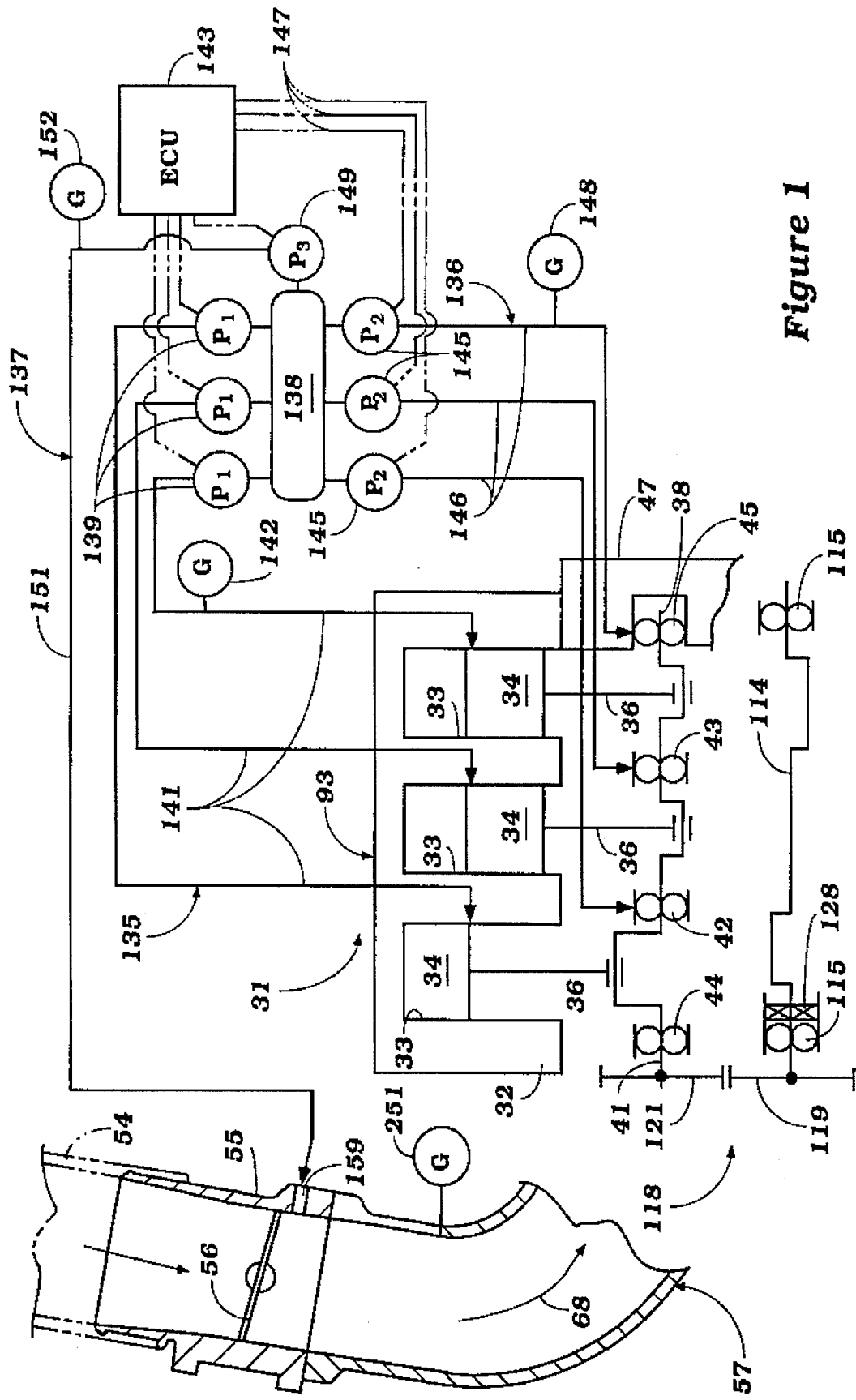
FIG. 1 is a partially schematic, partially cross-sectional view showing an internal combustion engine and lubricating system constructed in accordance with a preferred embodiment of the invention.

Referring initially primarily to FIGS. 1–4, a two-stroke, crankcase compression, internal combustion engine constructed and operated in accordance with an embodiment of the invention is indicated generally by the reference numeral 31. The engine 31 and its supporting components, as will be described, is laid out in such a way so as to facilitate its utilization in powering a motor vehicle, which will be described later by particular reference to FIGS. 13–20 and in which the engine 31 is positioned transversely in a forward positioned engine compartment of the vehicle for driving the front wheels thereof.

The engine 31 has a cylinder block assembly 32 that is provided with three cylinders bores 33 which, in the illustrated embodiment, are inclined slightly from a vertical plane in a forward direction when installed in a vehicle. Although the invention is described in conjunction with three cylinder engines having such an orientation, it will also be apparent to those skilled in the art how the invention can be applied to engines having other numbers of cylinders and other orientation of these cylinders such as V-type, opposed, etc. The invention does, however, have particular utility in conjunction with multiple cylinder engines having an in-line relation.

Pistons 34 are slidably supported within each of the cylinder bores 33 and are connected by means of piston pins 35 to respective connecting rods, indicated generally by the reference numeral 36. The lower or big ends 37 of the connecting rods 36 are journalled on the individual throws 38 of a crankshaft, indicated generally by the reference numeral 39. The crankshaft 39 has main bearings 41 that are journalled within intermediate main bearings 42 and 43 and end main bearings 44 and 45.

The crankshaft 39 rotates in a crankcase chamber 46 of a crankcase assembly 47 which is formed by a skirt 48 of the cylinder block 32 and a crankcase member 49 that is detachably connected thereto in a well known manner. The throws 38 have counterweight portions 51 and the configuration of the crankcase chamber 46 is such as to maintain as small a clearance volume as possible, as is desirable with two-cycle engine practice. As is also typical with two cycle engine practice, the areas of the crankcase chamber 46 associated with each of the cylinder bores 33 are sealed from each other by seals 52 that are disposed between the respective main bearings 42, 43, 44 and 45 as is well known in this art.

Figure 3:
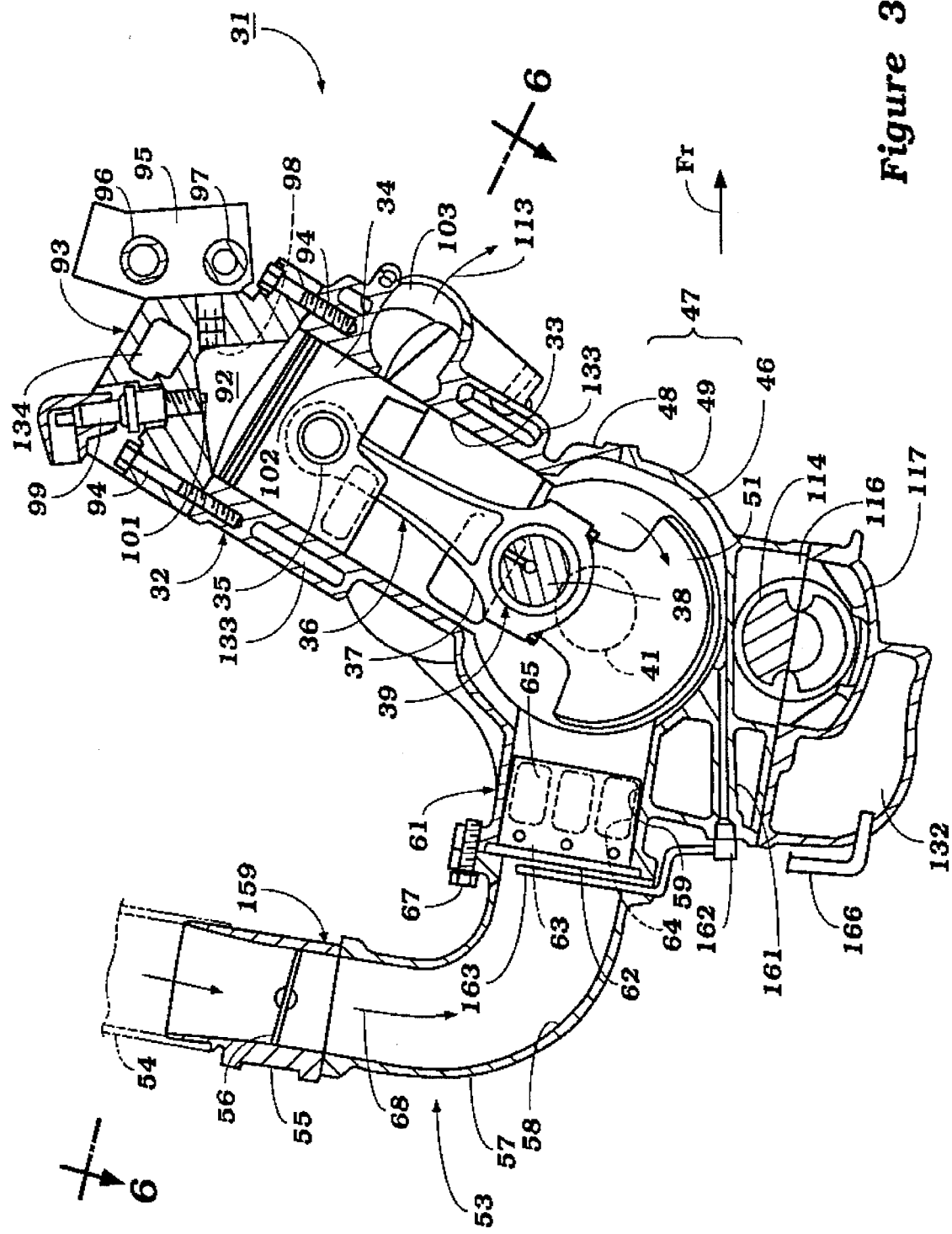
FIG. 3 is a cross-sectional view of the engine taken along the line 3—3 of FIG. 2 and shows a portion of the engine which is also shown in cross section in FIG. 1.
Figure 4:
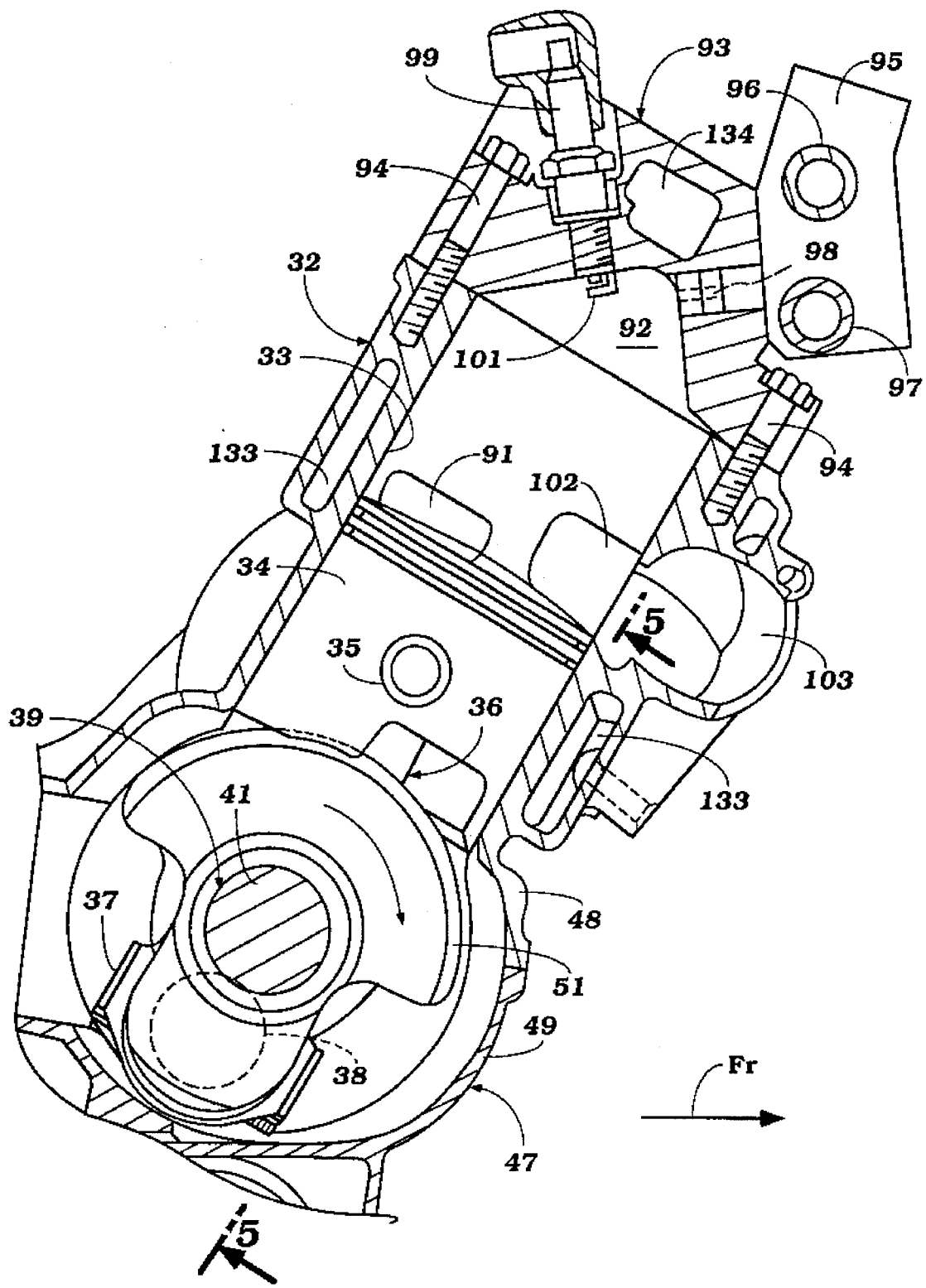
FIG. 4 is a further enlarged cross-sectional view taken along the same plane as FIG. 3.
Figure 5:
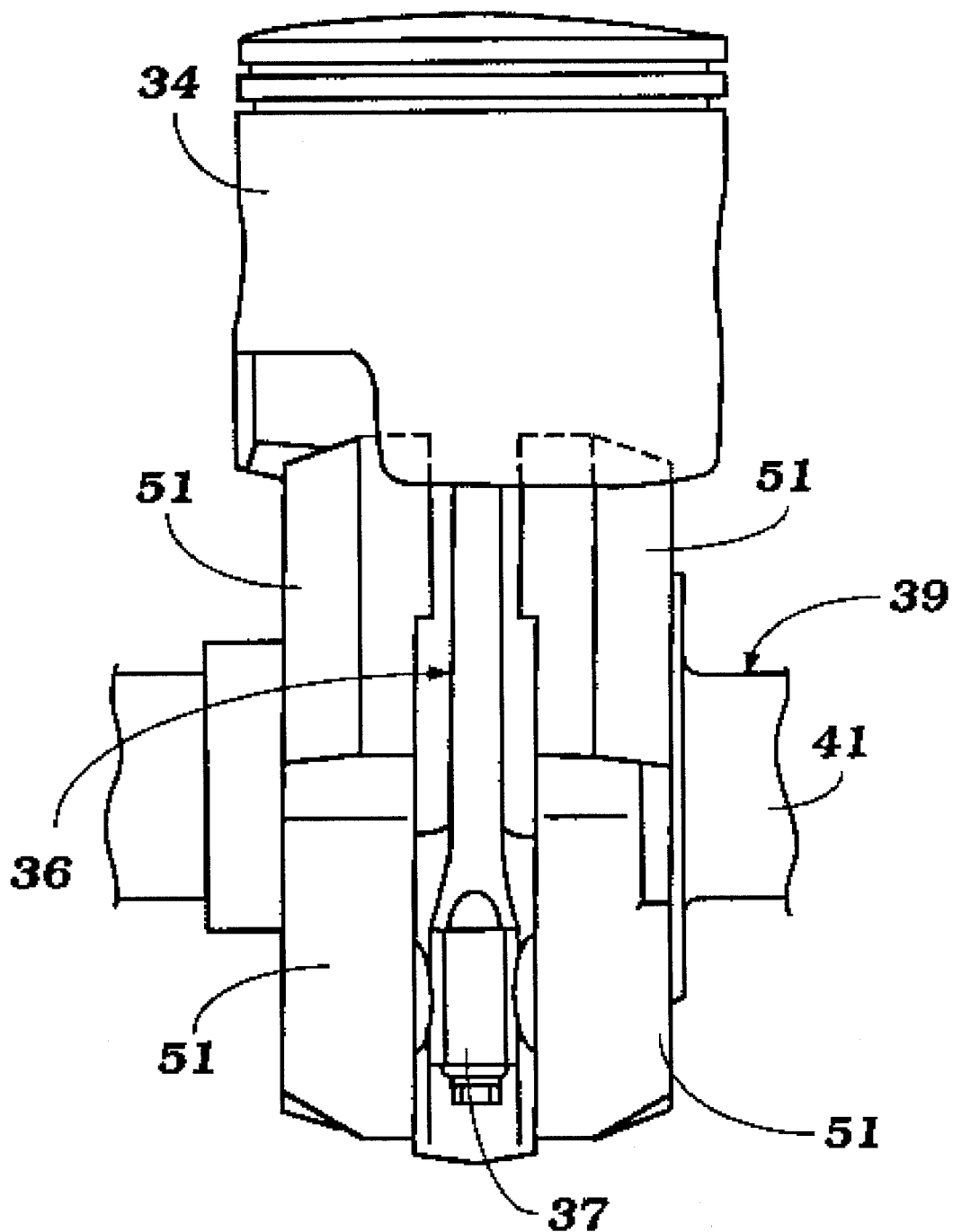
FIG. 5 is a side elevational view of the piston and connecting rod and looks generally in a direction of the arrows 5 in FIG. 4.
Figure 6:
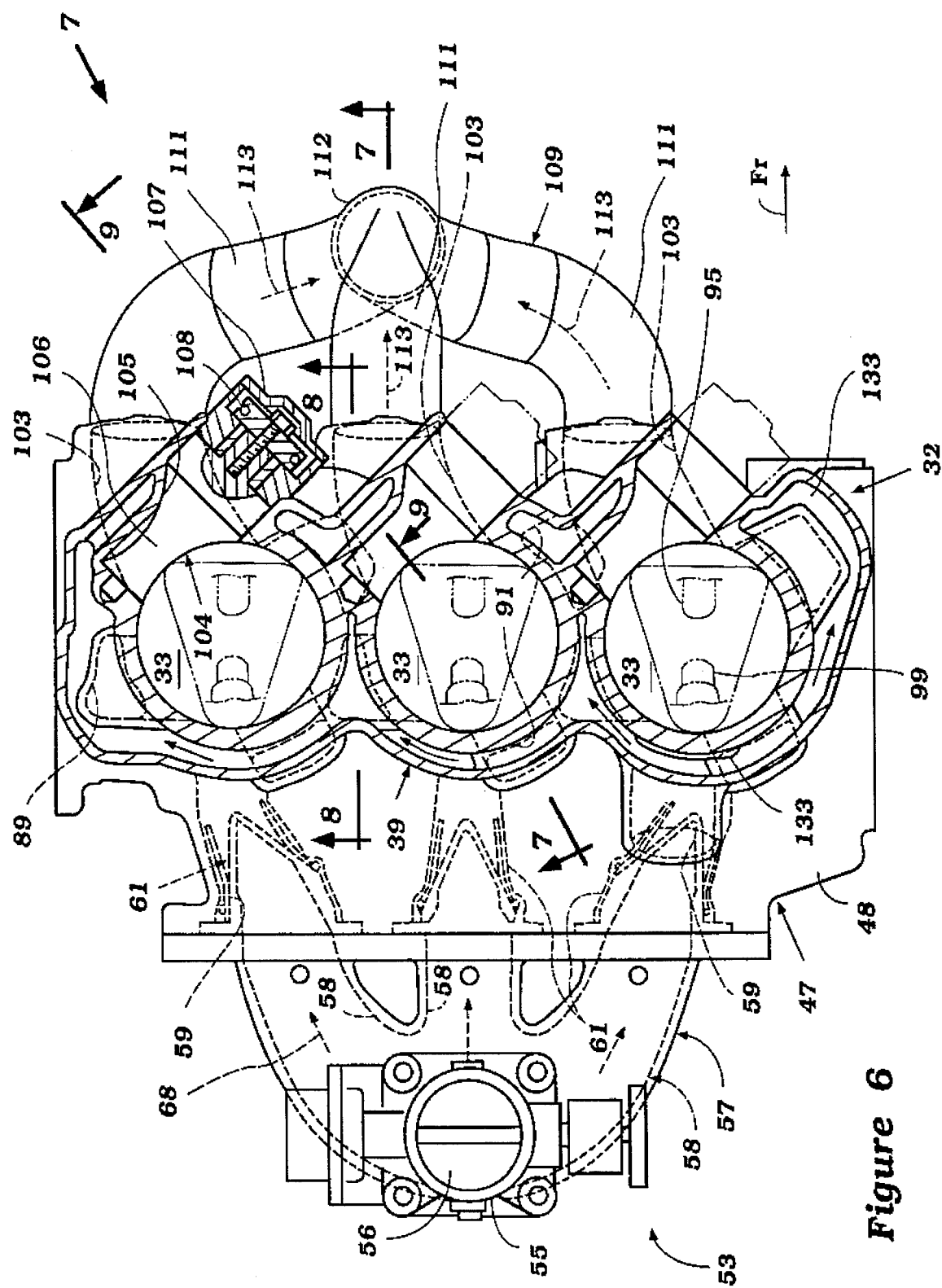
FIG. 6 is a cross-sectional view taken along the line 6—6 of FIG. 3.
Figure 7:
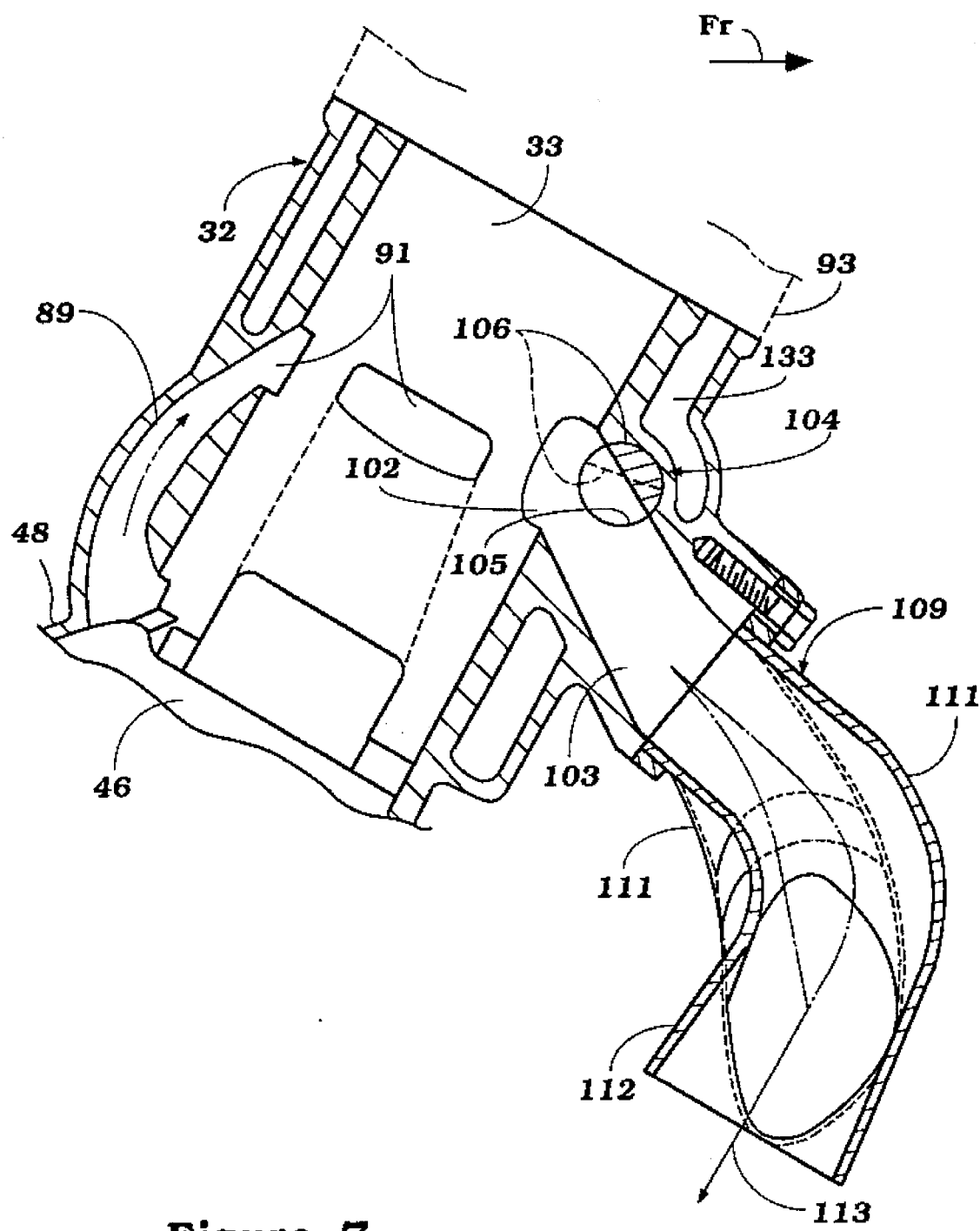
FIG. 7 is a cross-sectional view taken along the line 7—7 of FIG. 6.
Figure 8:
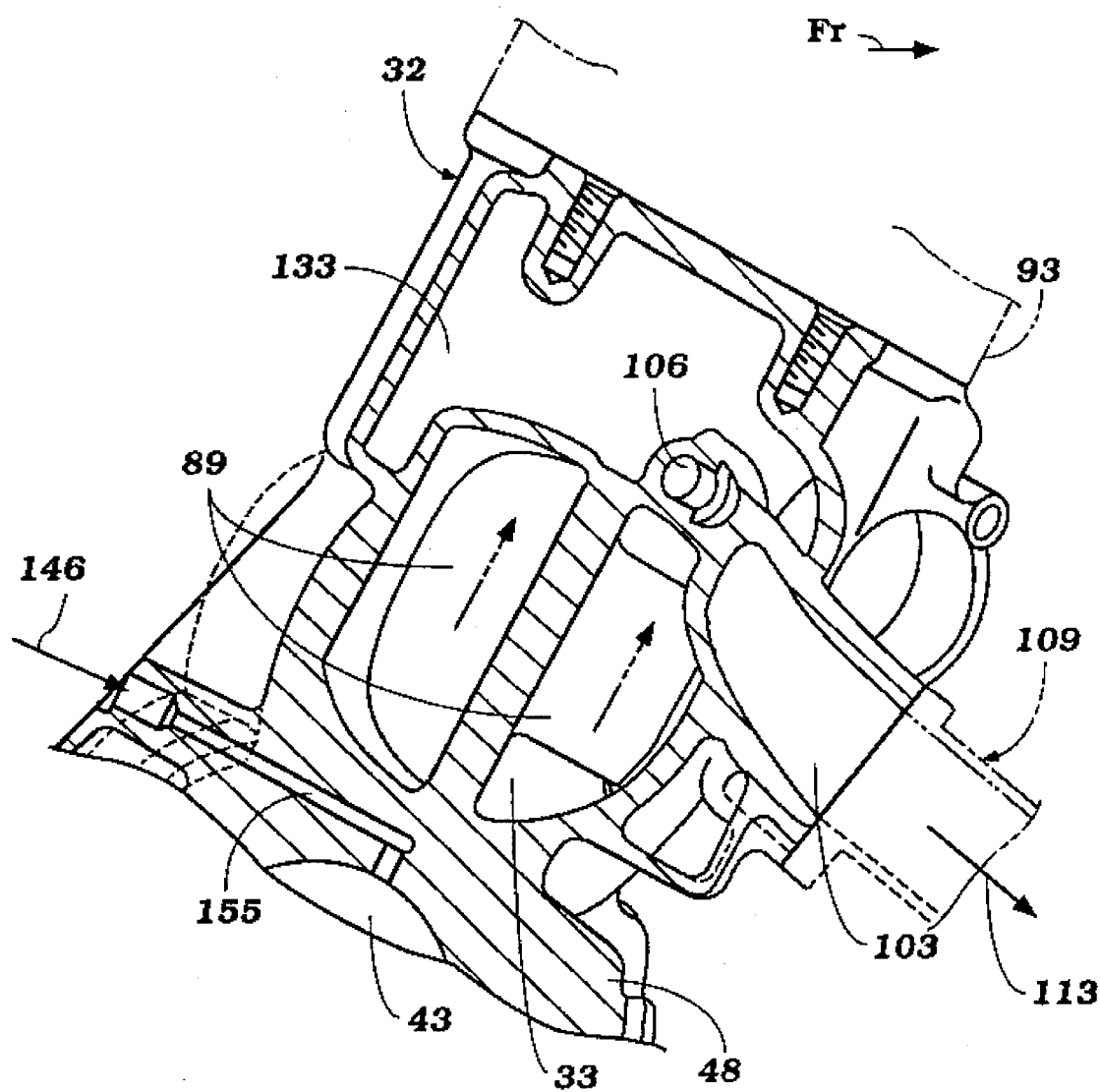
FIG. 8 is a cross-sectional view taken along the line 8—8 of FIG. 6.

An intake charge is delivered to the individual crankcase chambers 46 by an induction system, indicated generally by the reference numeral 53 and shown in most detail in FIG. 3. This induction system 53 also appears in FIGS. 6 and 11 partially in the latter case. The induction system 53 receives air from a vehicle air inlet silencer and cleaner (to be described later by reference to FIGS. 13–20) through a duct 54 shown in phantom in FIG. 3.

The duct 54 communicates with a throttle body 55 in which a single manually positioned throttle valve 56 is positioned for controlling the speed of the engine 31 in a well-known manner. The throttle valve 56 is controlled through a suitable linkage system (not shown).

The throttle body 55 communicates with an inlet opening of an intake manifold indicated generally by the reference numeral 57 and having individual runners 58 each of which terminates at a respective intake port 59 formed in the crankcase 47 in communication with the respective crankcase chamber 46. Reed type check valve assembly 61 comprised of a caging member 62 that has a V-shaped configuration and which defines a recess 63 between its angularly disposed sides. These sides have openings 64 with the flow through these openings being controlled by reed type valve elements 65 that are fixed to the caging member 62 in a well known manner. Threaded fasteners 66 maintain the manifold 57 to the crankcase assembly 47 with the reed type valve caging member 62 being sandwiched therebetween.

As the pistons 34 move upwardly in the cylinder bores 33 they will cause a pressure drop in the respective crankcase chambers 46 causing air to flow through the induction system 53 in the direction indicated by the broken arrows 68 in certain of the figures. This air then enters the crankcase chambers 46 through the opening of the reed valve assemblies 61.

As the pistons 34 move downwardly this charge will be compressed and then forced through scavenge passages 89 (FIG. 7) formed around the circumference of each of the cylinder bores 33 in the cylinder block 32. This charge will then enter the cylinder bores 33 through scavenge ports 91 formed circumferentially around the cylinder bores 33.

Referring now again primarily to FIGS. 1–4, this charge exiting the scavenge ports 91 enters a combustion chamber that is formed by the cylinder bore 33 above the heads of the pistons 34 and combustion chamber recesses 92 formed in a cylinder head assembly, indicated generally by the reference numeral 93, that is affixed to the cylinder block 32 by fasteners 94. This charge is further compressed as the pistons 34 move upwardly in the cylinder bores 33.

In the illustrated embodiment, the engine 31 is supplied with fuel by direct cylinder injection via air/fuel injectors, indicated generally by the reference numeral 95. In the illustrated embodiment, the injectors are air/fuel injectors and receive fuel, from a system to be described when the vehicle is described by reference to FIG. 13–20 from a fuel conduit 96 and compressed air from an air supply system, also to be described by reference to the vehicle, including a supply conduit 97. The air/fuel injectors 95 are mounted in the cylinder head 93 and have nozzle portions 98 which are disposed so as to inject fuel and compressed air into the cylinder head recesses 92. Any form of known air/fuel injector may employed as the injectors 95.

Alternatively, only fuel may be injected into the combustion chambers 92 by the injectors 95. Also, rather than employing direct cylinder injection fuel may be injected elsewhere into the induction system or, if desired, the invention may be employed with carbureted engines. In the illustrated embodiment, the engine is spark ignited although it should be readily apparent to those skilled in the art that the invention may also be employed in conjunction with diesel engines.

The combustible charge delivered to the combustion chambers, including the cylinder head recesses 92, is fired by means of spark plugs 99 that are affixed to the cylinder head 93 and have their gaps 101 extending into the cylinder head recesses 92. The spark plugs 99 are fired by any suitable ignition system.

The ignited charge will burn and expand to drive the pistons 34 downwardly and drive the crankshaft 39. Eventually, the downward movement of the pistons will open exhaust ports 102 for discharge through an exhaust system which will now be described by particular reference to FIGS. 3, 4 and 6–9. This exhaust system includes exhaust passages 103 that extend through the cylinder block 32 on the side opposite the scavenge passages 91 so that the scavenging charge will cause a Schnurl type of scavenging in the combustion chamber.

Exhaust control valves, indicated generally by the reference numeral 104, are mounted in the sides of the exhaust passages 103 adjacent the exhaust ports 102. These exhaust valves 104 are mounted in bores 105 that extend transversely to the cylinder bores 33 and contain rotary valve elements that have a cutout portion 106 which when rotated will obscure a portion of the upper part of the exhaust ports 102 so as to in effect delay the opening of the exhaust ports on downward movement of the piston and advance the closing of the exhaust ports 102 on the upward movement of the piston so as to in effect increase the effective compression ratio of the engine. Any desired type of strategy can be employed for so positioning the exhaust valve elements 106 and controlling the compression ratio to achieve the desired result.

Figure 9:
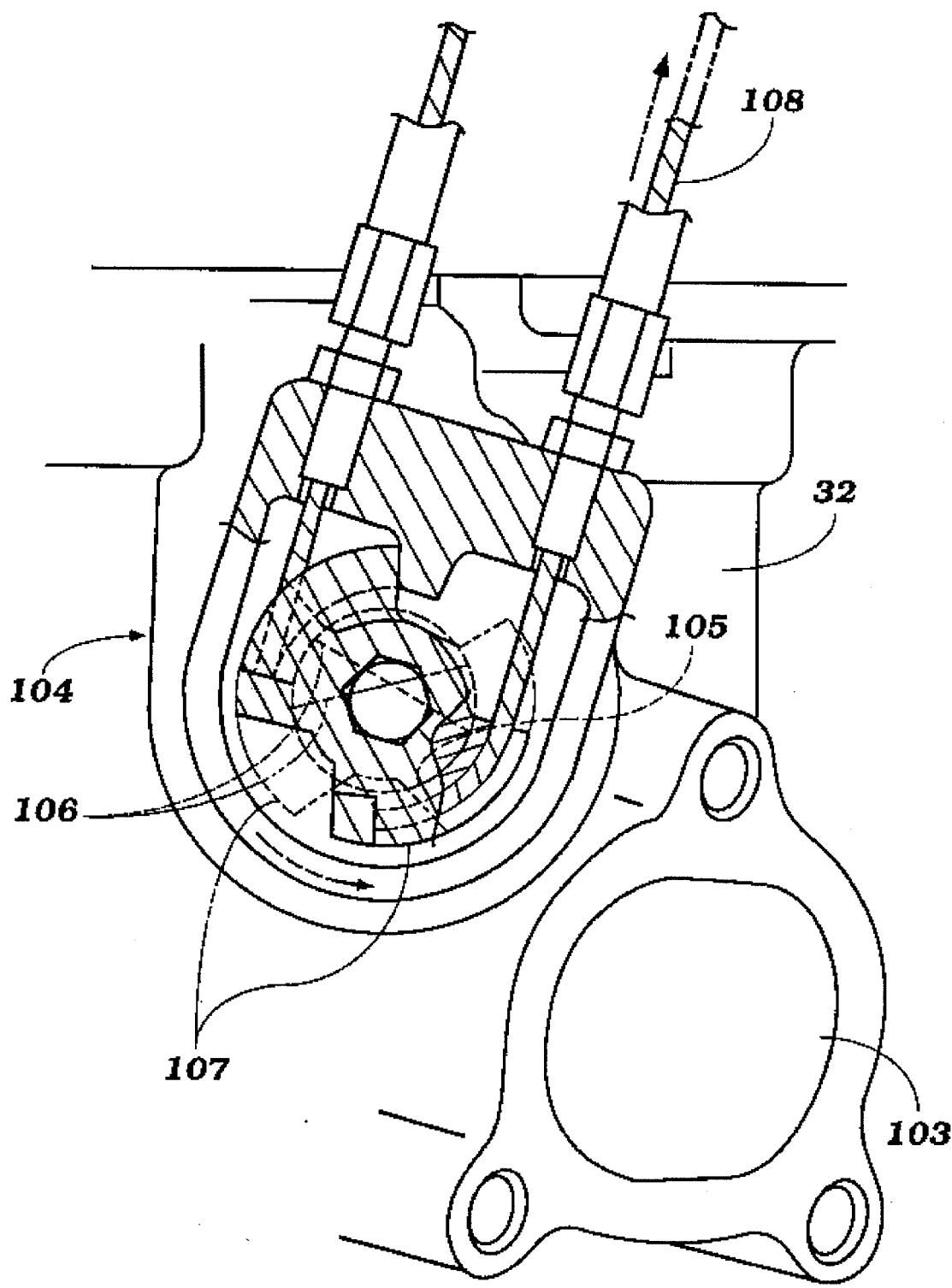
FIG. 9 is a cross-sectional view taken generally along the line 9—9 of FIG. 6 and shows the actuating mechanism for one of the exhaust control valves in more detail.

Referring specifically to FIG. 9, the exhaust control valve elements 106 have end portions to which a pulley 107 is affixed. A wire transmitter 108 is connected to this pulley and is connected at its opposite end to a servomotor (not shown) that is operated by any known type of control strategy for appropriately varying the compression ratio. The compression ratio may be lowered at high speed, high load conditions and maintain higher at low speed, low load conditions in order to minimize thermal loading on the engine in one form of strategy.

An exhaust system including an exhaust manifold, indicated generally by the reference numeral 109, is attached to the cylinder block 32 and communicates with an exhaust system for discharging exhaust gases to the atmosphere which exhaust system will be described later by reference to FIGS. 13–19.

The exhaust manifold 109 includes individual runner sections 111 each extending from a respective one of the exhaust passages 103 and terminating in a downwardly facing common collector section 112. The exhaust gases flow in the direction of the arrow 113.

In order to promote smooth running and minimum vibrations generated from the engine 31, it is provided with a balancer shaft 114, the construction and operation of which may be best understood by reference to FIGS. 1–3, 10 and 11. This balancer shaft 114 is rotatably journalled by means of a pair of spaced apart bearings 115 disposed in the front and rear walls of the crankcase forming number 82 and which is contained within a chamber 116 that is disposed adjacent but separated from the crankcase chamber 46 by an integral wall. The lower portion of this chamber 116 is enclosed by a lower wall 117.

Forwardly of the forwardmost bearing 115, a transmission assembly, indicated generally by the reference numeral 118, is provided for driving the balancer shaft 114 at the same speed but in an opposite direction to the crankshaft 39. This transmission 118 includes a first gear 119 that is affixed in a manner to be described to the outer end of the balancer shaft 114 and a second gear 121 which is affixed for rotation with the crankshaft 39. This transmission 118 is contained within a transmission cavity 122 formed in part by a front wall 123.

Figure 10:
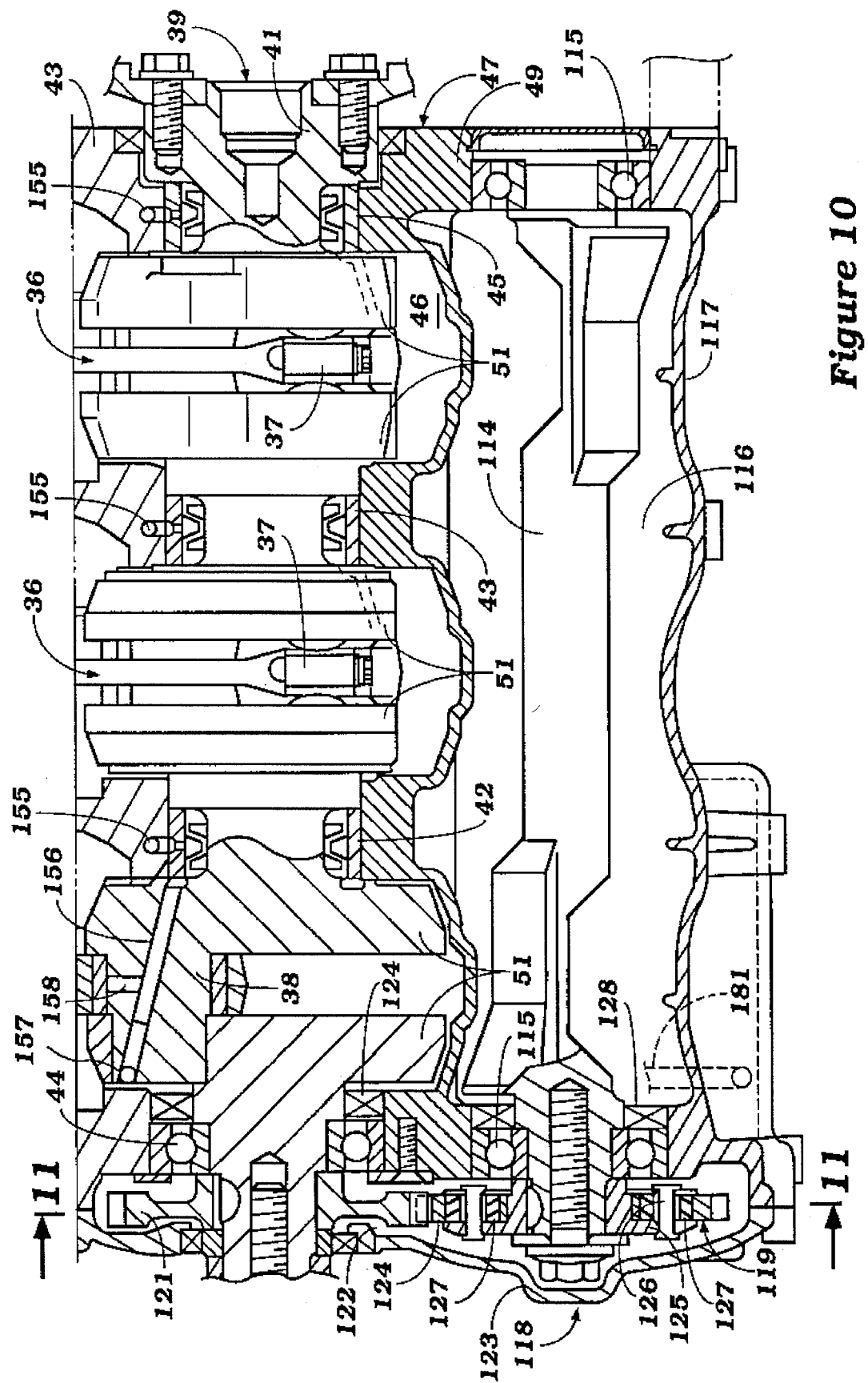
FIG. 10 is a further enlarged cross-sectional view of a portion of FIG. 2 showing the crankshaft and balance shaft and drive arrangement therebetween.
Figure 11:
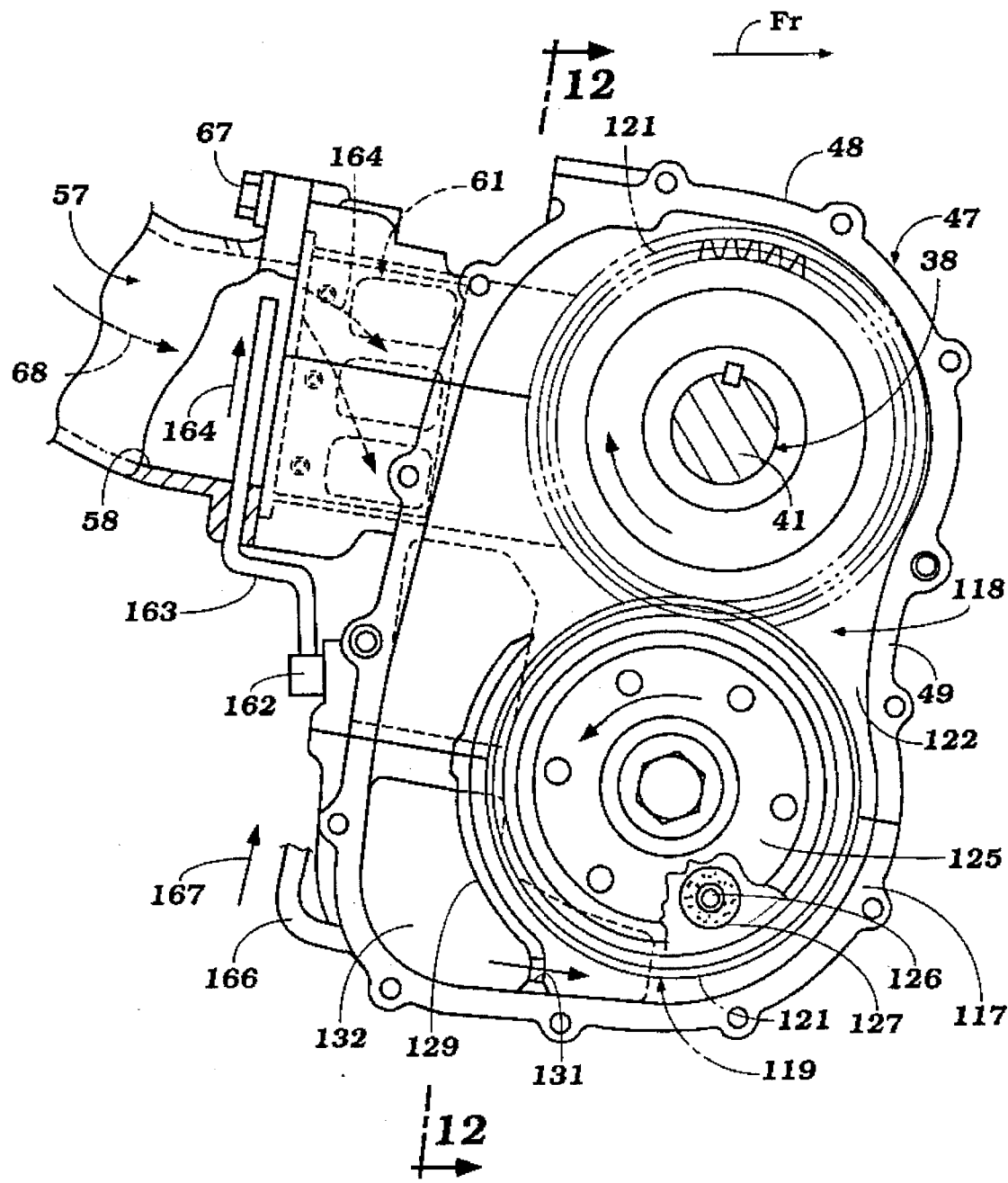
FIG. 11 is a cross-sectional view taken along the line 11—11 of FIG. 10 and shows the driving transmission arrangement for the balancer shaft with portions broken away.

As may be best seen in FIGS. 10 and 11, the gear 119 is affixed to the balancer shaft 114 by means of a flexible coupling so as to provide some torsional damping. Thus, the gear 119 includes an outer ring segment 124 that is connected to a hub portion 125 by means of a plurality of pins 126 and surrounding elastic dampers 127.

On the opposite side of the front bearing 115, the compartment 116 is sealed by means of an oil seal 128 for a reason which will become apparent.

The transmission cavity 121 is provided with an internal wall 129 (FIG. 11) in which a restricted opening 131 is provided. This forms a second cavity 132 to one side of the transmission 118. The right hand side of the wall 129 can be filled with lubricant to a level that will approach or even be higher than the axis of rotation of the balancer shaft 114 when the engine is not running. However, due to the rotation of the gear 119 as shown by the arrows in FIG. 11, the gear teeth 124 will pick up the lubricant and throw it over the wall 129 into the cavity portion 132 where it will accumulate when the engine is running. Thus, adequate lubrication for the transmission 118 is possible but drag is minimized since when the engine is running the lubricant will seep slowly back into the transmission cavity 122 through the restricted opening 131 and only the lower tips of the teeth of the gear 119 will be emersed.

The engine 31 is liquid cooled and thus both the cylinder block 32 and cylinder head 93 are provided with respective cooling jackets 133 and 134, respectively, which cooling jackets appear in FIGS. 2, 3, 4, 6, 7 and 8. Coolant is circulated through this cooling jacket in a manner which will be described when the vehicle is described by reference to FIGS. 13–19.

The Lubricating System

The lubricating system for the engine 31 will now be described in detail initially by reference to FIG. 1, wherein many of the components of the lubricating system are shown schematically. The lubricating system includes a direct cylinder lubricating system, indicated generally by the reference numeral 135, for lubricating the cylinder wall 33 and sliding surfaces of the pistons 34. A further lubricating system 136 is provided for directly lubricating the crankshaft bearings 41 and the main bearings 42, 43, 44 and 45 thereof. Finally, there is provided a lubricating system 137 which delivers lubricant to the engine for indirect lubrication through the induction system.

As will become apparent, each of these lubricating systems 135, 136 and 137 is separately controlled and except for the system 137 has portions so that the components of each cylinder can be controlled separately from each other. In this way, it will be ensured that each portion of the engine will be adequately lubricated but that excess lubricant need not be supplied since the amount of lubricant supplied to the individual components of the engine and the individual components associated with each cylinder separately and independently.

Still referring primarily to FIG. 1, the lubricating system 135 includes a lubricant reservoir 138 common for all of the systems 135, 126 and 137 and from which a first series of lubricant pumps 139, one for each cylinder, are provided and each of which supplies lubricant to a respective conduit 141 that terminates in the cylinder wall of the cylinder bores 33 in an area swept by the skirts of the pistons 34, as will be described. A first pressure gage 142 is positioned in at least one of the lines 141 for providing an indication of the pressure of the lubricant being supplied.

The lubricant pumps 139 are driven independently of each other at either a duty cycle or rate of speed as controlled by an ECU 143 which outputs control signals to the lubricant pumps of the system 135 through control lines indicated schematically at 144 in this figure. The ECU 143 receives signals from the engine indicative of its operation so that the desired amount of lubricant, as will be described, can be supplied. These signals generally may include an engine speed signal determined by a speed sensor and load signal, as determined by a throttle position sensor or other mechanism.

The crankshaft bearing lubricating system 136 includes a plurality of pumps (one for each cylinder) 145 which also draw lubricant from the common reservoir 138 and delivers it to the center main bearings 42 and 43 and rear main bearing 45 through conduits 146. Like the pumps 139 for the cylinder lubrication, the pumps 145 receive individual control signals from the ECU 143 via conductors indicated schematically at 147. Again, a pressure gage 148 may be positioned in one of the conduits 146 for providing an indication of pressure output. The amount of lubricants supplied by the pumps 145 is varied by the ECU 143 by using maps for each cylinder indicative of the required lubricant supply amount as determined experimentally and in response to engine running conditions, for example aforenoted.

It should be noted that the running conditions employed for controlling the lubricating systems 135, 136 and 137 need not be all the same but in a preferred embodiment they are. Finally, the indirect lubricating system 137 includes a single pump shown schematically at 149 which are also controlled by the ECU 143 and draw lubricant from the common reservoir 138. Lubricant is supplied to the intake manifold 57 from the pump 149 through a conduits 151 and a pressure gage 152 may be positioned in this conduit.

The actual engine structure that completes the lubricant supply systems 135, 136 and 137 now will be described by reference to the remaining figures. Turning first to the direct cylinder lubricating system 135, this system is illustrated in the engine in FIG. 2 wherein it will be seen that the cylinder block 32 is formed with a number of drilled passages 153 that communicate with the conduits shown schematically at 141 in FIG. 1 and which are cross drilled as at 154 so as to deliver lubricant directly to the cylinder bore 33 in an area swept by the skirts of the pistons 34. There may be provided a plurality of circumferentially spaced drilling for ensuring adequate lubricant to all sides of the skirts of the pistons 34.

The system 136 for lubricating the crankshaft 38 will now be described by particular reference to FIGS. 2 and 10 in addition to FIG. 1. The lower portion of the cylinder block 32 is provided with a further series of cross drilling 155 adjacent each of the main bearings 42, 43 and 45. Radially extending drilling intersect these cross drilling and deliver the lubricant directly to these main bearings. The drillings 155 communicate with the conduits 146 shown schematically in FIG. 1.

In addition, the sides or throws 51 of the crankshaft 39 have cross drilling 156 which begin from adjacent from the respective bearings 42, 43 and 52 and pick up the lubricant which has lubricated these bearings. The cross drilling 156 are angularly disposed and are closed at their outer ends by plugs 157. The throw bearing portions 38 are provided with cross drilling 158 so that lubricant will flow by centrifugal force to lubricate the throws and big ends of the connecting rods 36.

It should be noted that the front main bearing 44 and the bearing 155 for the balancer shaft 114 will be lubricated by splash of the lubricant contained within the cavity 122. Therefore, no separate lubricating system is required for these two bearings.

The indirect lubricating system 137 for the remaining components of the engine 31 will now be described by primary reference to FIGS. 1 and 3. As has been noted, the lubricant from this lubricating system 137 is delivered to the induction system and particularly to the intake manifold 57. For that purpose, the manifold inlet upstream of the runners 58 is provided with a drilled passageway 159. This passageway 159 is disposed downstream of the throttle valve 56 but upstream of their respective reed valves 61 and runners. By introducing this lubricant upstream of the reed valve 61, the lubricant will somewhat dampen the sounds created by the reed valve 65 and will thus provide for a smoother running engine as well as lubricating the components of the engine not directly lubricated. This includes primarily the piston pins 35. Because the lubricant from the system 137 is introduced to the inlet to the intake manifold 57, it will be distributed equally to each crankcase chamber.

It should be noted that some lubricant may collect in the crankcase chambers 46. This lubricant is drained by means of a passageway 161 formed in the crankcase member 49 at a lower portion thereof. A fitting 162 is connected to each passageway 161 and includes a tube 163 that extends into each intake manifold runner 58 upstream of the reed valve assembly 61 and also at a point at the top of this runner. Because of the running of the engine, there will be a reduced pressure existent in the end of the tube 163 and this will tend to draw lubricant from the crankcase chambers 46. If desired, the fitting 162 may also include a check valve so that lubricant can flow only from the crankcase chambers 46 to the manifold runners 58.

Figure 12:
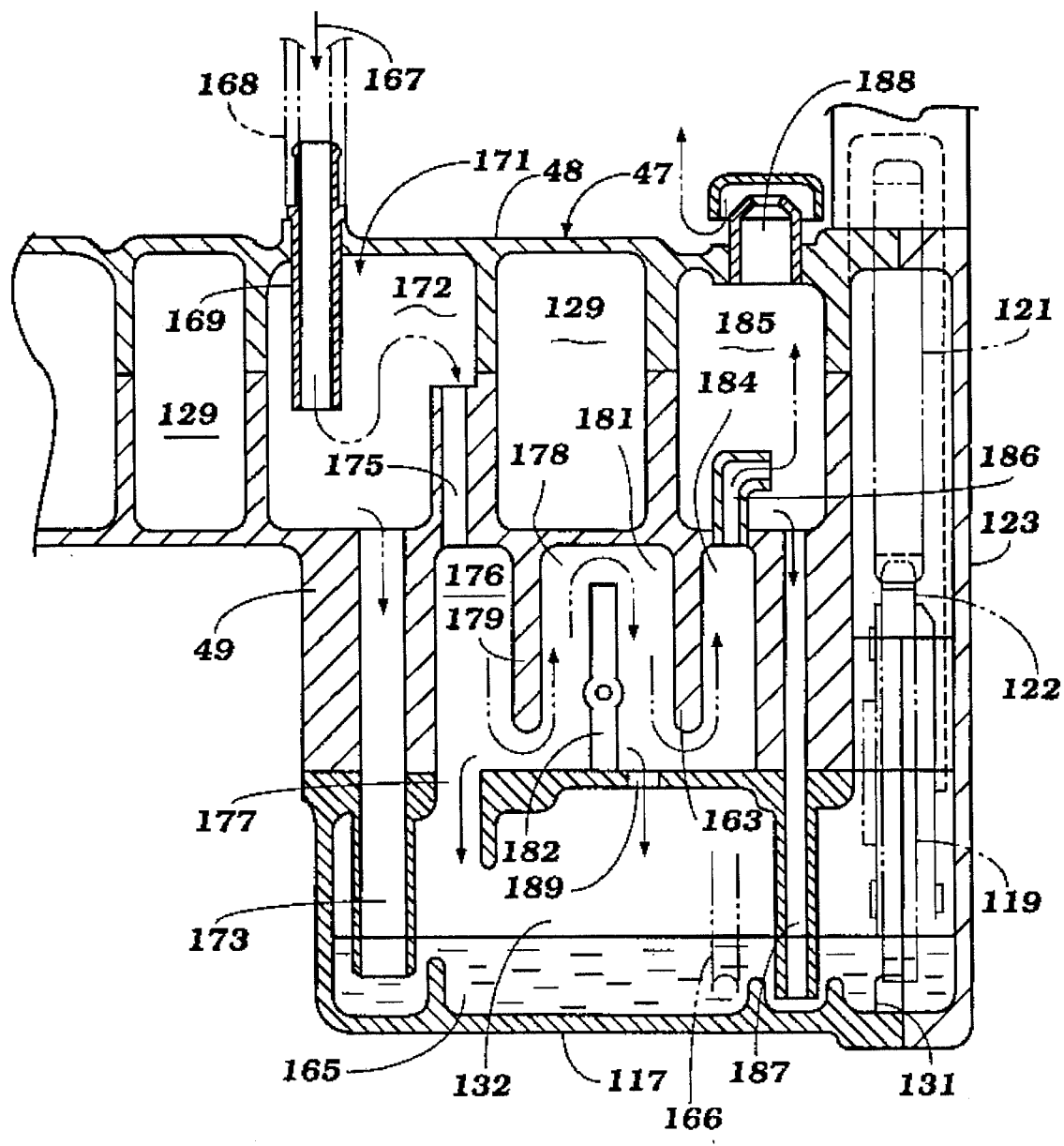
FIG. 12 is a cross-sectional view taken along the line 12—12 of FIG. 11 and shows the oil separating arrangement for the vacuum pump lubrication system.

Referring now primarily to FIG. 12, the lubricant in the transmission cavity 122 and specifically that contained to the side of the wall 129 indicated by the reference numeral 132 actually extends back along a side of the crankcase 47 beneath the forwardmost intake passage 59 so as to contain an adequate volume of lubricant. This lubricant is utilized also to lubricate a vacuum pump for operating certain accessories of the vehicle (to be described later by reference to FIGS. 13–20) and to separate the lubricant from the air which is then discharged to the atmosphere by this vacuum pump.

Oil is supplied from the chamber 132, the lubricant being indicated by the level line 165, through a delivery conduit 166 in the direction of the arrow 167 in FIG. 11. After being circulated this lubricant will become mixed with the air pumped by the vacuum pump and will be returned as shown by the arrow 167 in FIG. 12 through a conduit shown in phantom in this Figure and indicated by the reference numeral 168. This conduit 168 slips over an inlet tube 169 which discharges into the oil separator, indicated generally by the reference numeral 171 and specifically a first chamber 172 thereof which is formed in the side of the crankcase portion 48. A first passageway 173 will accept oil condensing in the chamber 172 and return it to the chamber 132 below the lubricant level 165.

An air passage 175 extends from the chamber 172 above the lubricant passage 173 to a further chamber 176 formed below the chamber 172 and which communicates with the lubricant chamber 132 through a large drain passageway 177. A further chamber 178 is separated from the chamber 176 by a partial wall 179 so as to provide a labyrinth type air flow through the separator 171 and into a further chamber 181 which is separated from the chamber 178 by another partial wall 182. A yet further wall 183, which is also a partial wall, provides restrictive communication between the chamber 181 and a further expansion chamber 184. The chamber 184 communicates with a chamber 185 formed in the side of the crankcase 48 through a short angled tube 186. The chamber 185 has a further drain passage 187 formed below the pipe 186 and which will also return lubricant to the chamber 132 below the level 165 therein. The chamber 185 then discharges the air pumped by the vacuum pump and which has had substantially all of the lubricant separated from it by the separator 171 to the atmosphere through a baffled discharged 188.

The chambers 178, 181 and 184 can drain back to the chamber 132 through a further drain passage 189.

The Vehicle (FIGS. 13–20)

The engine 31 as thus far described may be utilized for any of a multitude of purposes. However, the engine 31 is particularly adapted by-powering a motor vehicle and its components and auxiliaries (both as already described and which will be now described) are laid out to facilitate such application. A motor vehicle of the type which may be powered by the engine 31 is depicted in phantom in portions of FIGS. 13–20 and is identified generally by the reference numeral 191. The vehicle 191 is provided with a frame and body assembly 192 having a pair of front wheels 193 suspended therefrom by a suitable suspension system and which front wheels 193 may be steered by any known type of steering mechanism. At the rear end of the vehicle 191, the body frame assembly 192 suspends a pair of rear wheels 194. Again, any suitable type of suspension system may be provided for suspending these rear wheels.

The motor vehicle 191 is of the type that employs a transverse engine placement and drive of the front wheels 193. To this end, the engine 109 is mounted in the frame assembly at the front of the vehicle 191 by engine mounts 195 and 196. The engine 31 is positioned in an engine compartment at the front of the vehicle and which is accessible through a hood 197 (FIG. 14) in a known manner. The transverse positioning of the engine means that its crankshaft 39 rotates about an axis disposed transversely to the longitudinal center line of the vehicle 191.

Figure 2:
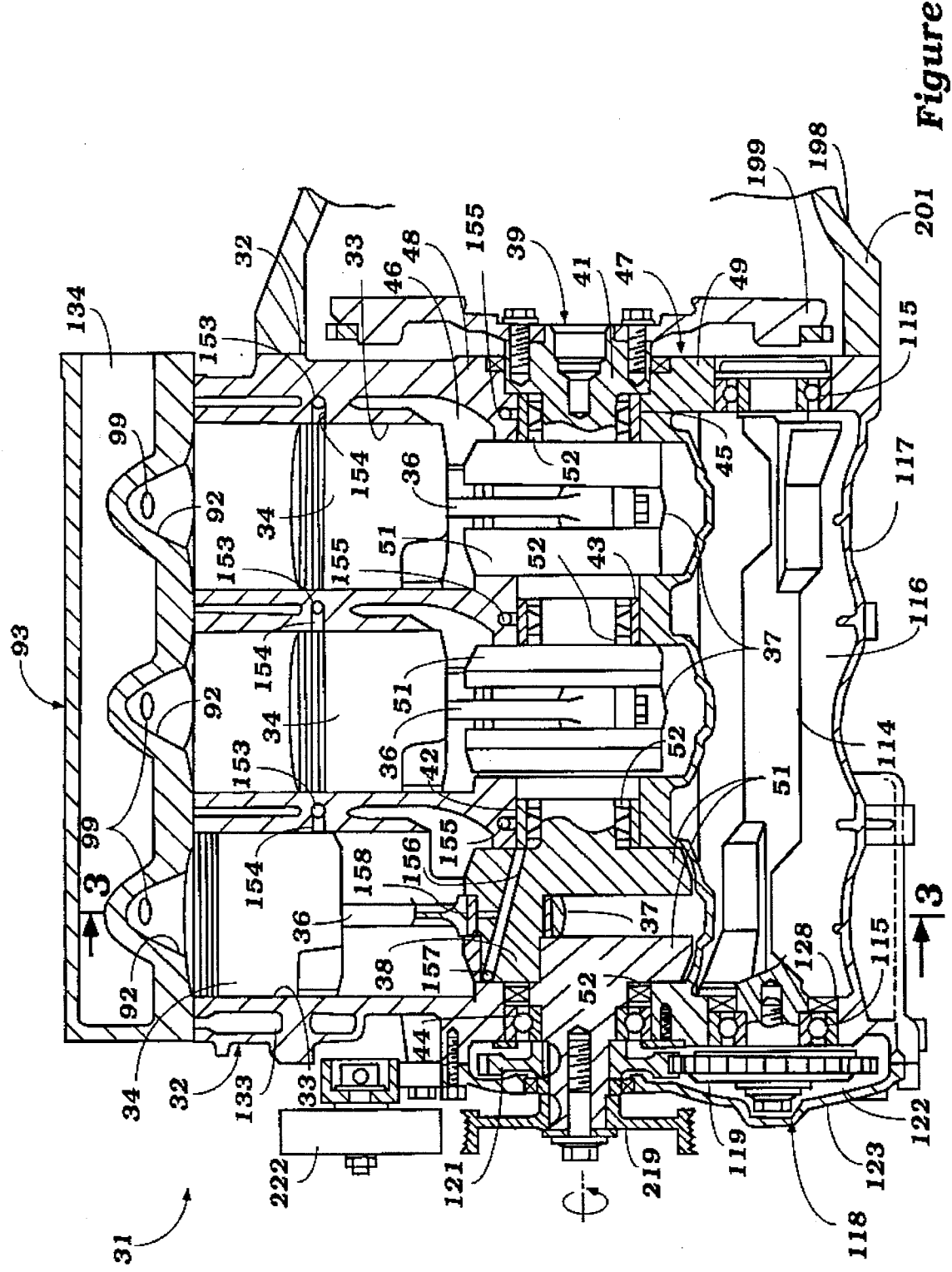
FIG. 2 is a longitudinal cross-sectional view taken through the engine and the portions thereof shown schematically in FIG. 1.

A transmission 198 is coupled to the engine crankshaft 39 and is driven thereby through a clutch which is associated with a flywheel 199 (FIG. 2) positioned at one end of the transmission housing, indicated by the reference numeral 201 in FIG. 2. This transmission drives the front wheels 193 through any known type of transfer drive and differential assembly.

As has been noted, the induction system for the engine which was described previously draws air from within the engine compartment. This air induction system includes a plenum chamber 201 that is connected to the conduit 54 that extends to the throttle body 55 and which may include an air filter of any type. The plenum chamber receives ram inlet air from an inlet tube 202 that extends forwardly toward the grill opening at the front of the vehicle body 192.

Figure 14:
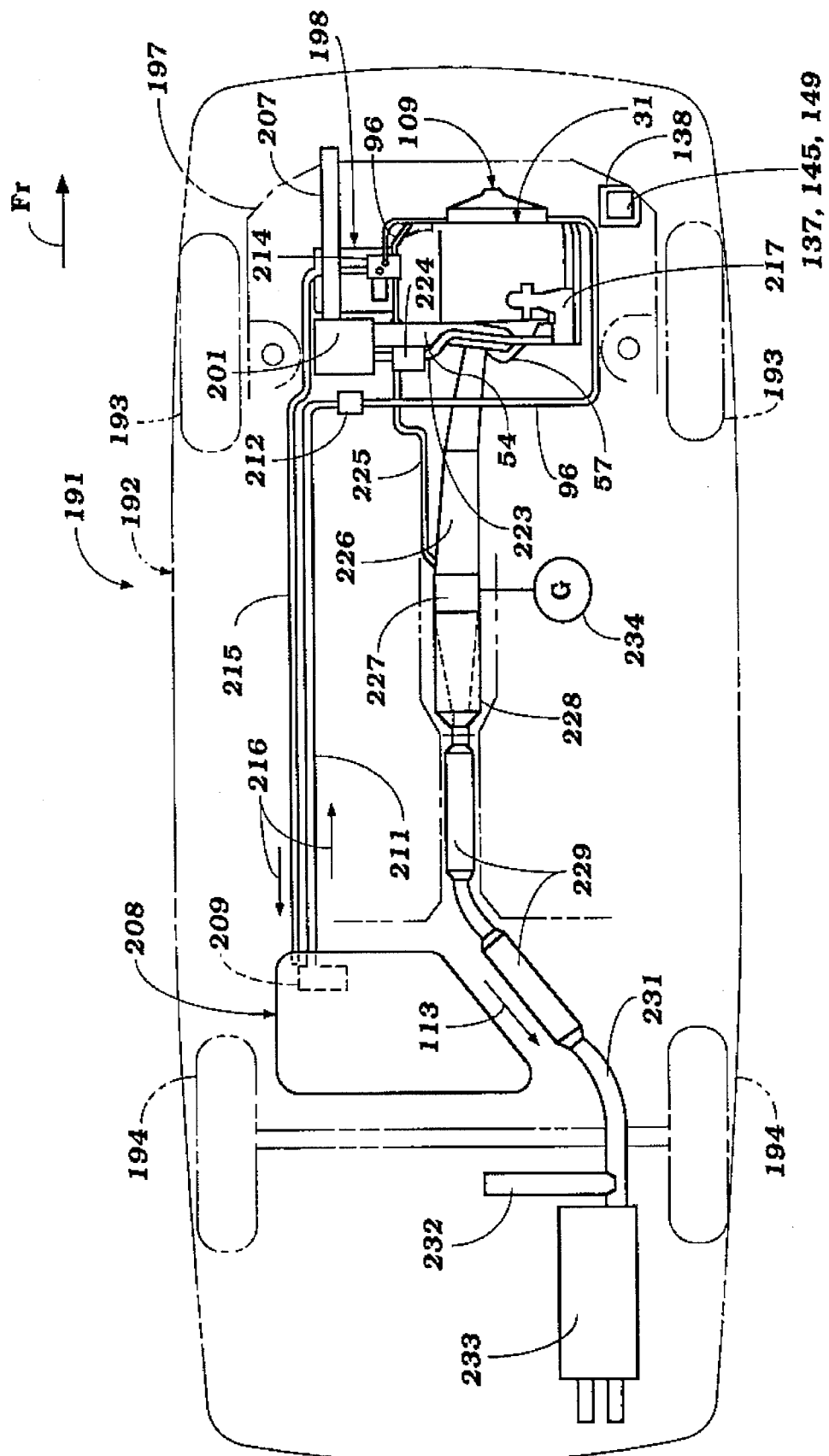
FIG. 14 is a bottom plan view of the installation shown in FIG. 13, with the motor vehicle also shown in phantom.
Figure 15:
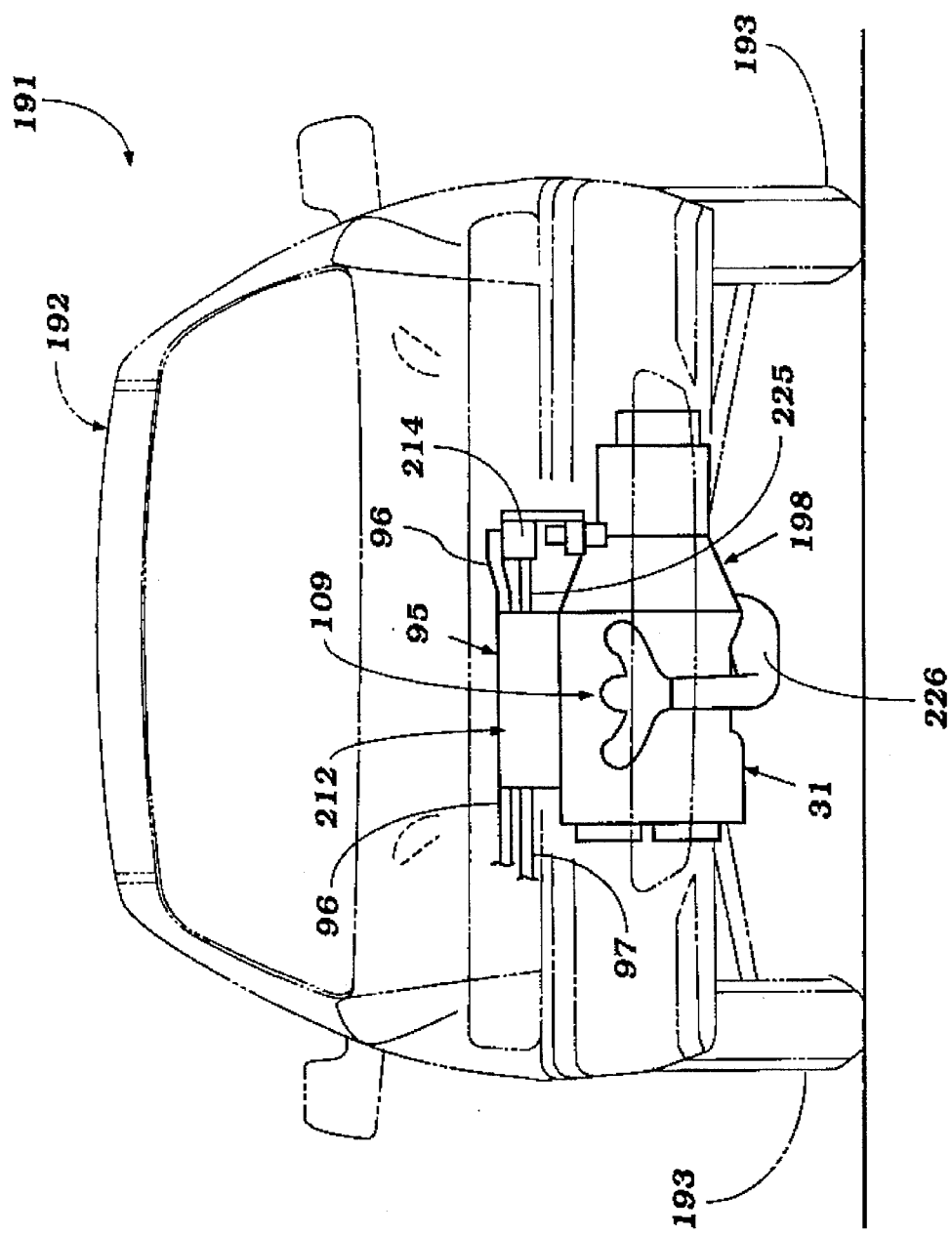
FIG. 15 is a front elevational view of the vehicle and engine, again showing the vehicle in phantom.
Figure 16:
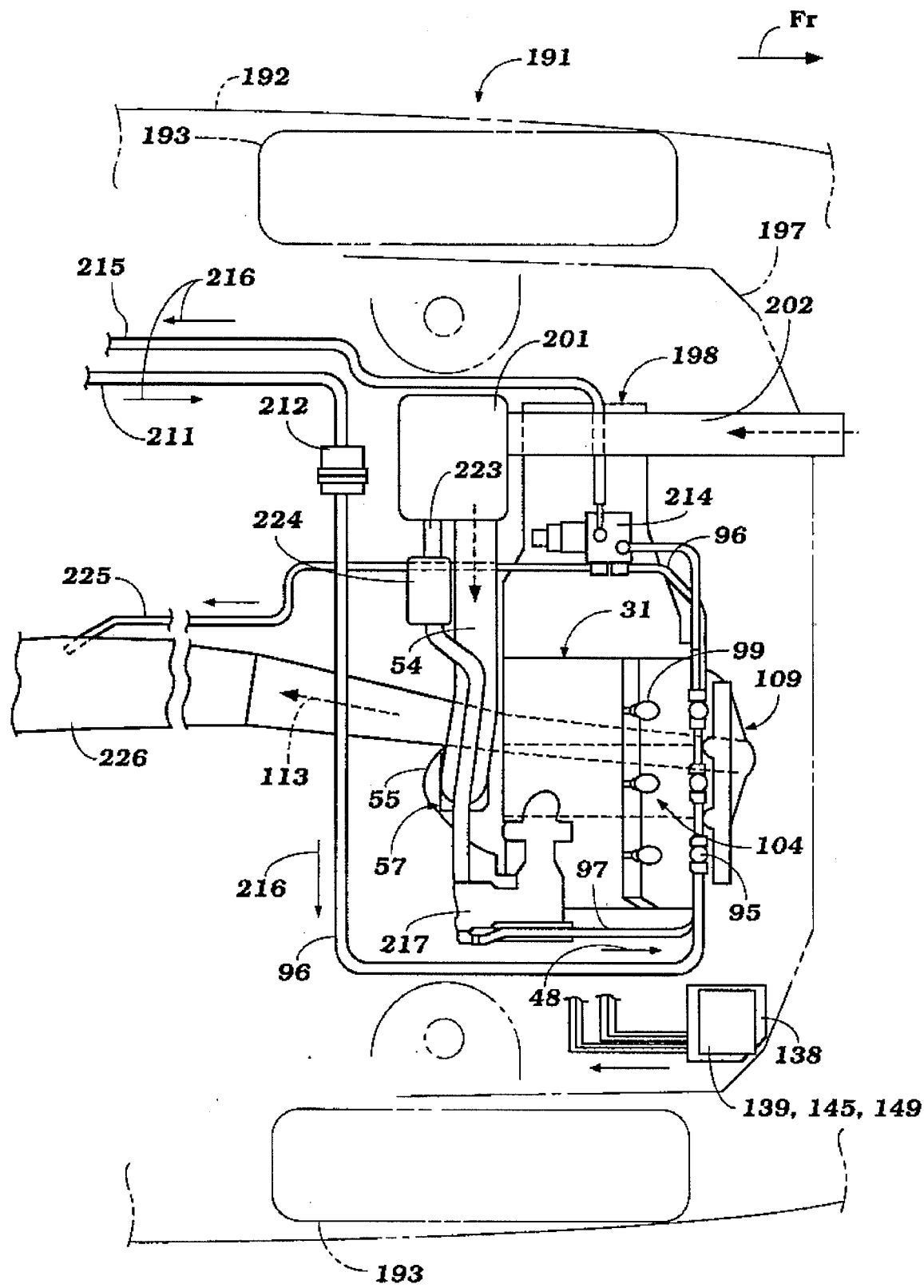
FIG. 16 is an enlarged top plan view of the forward portion of the vehicle, again showing the vehicle in phantom and the engine and its axillaries in solid lines.

It has been noted that the fuel injectors 95 inject fuel into the combustion chambers of the engine and the system for supplying fuel to the fuel injectors 95 will be described by primary reference to FIGS. 14–16. The vehicle body 192 is provided with a rearwardly positioned fuel tank 208 having an in-the-tank fuel pump 209 that delivers fuel through a conduit 211 to a fuel filter 212. The fuel filter 212 then delivers fuel to the aforenoted fuel conduit 96 which forms a portion of the fuel/air injection system and which includes a common fuel/air manifold and distributor rail, indicated generally by the reference numeral 212 that is connected in a known manner to the fuel/air injectors 95. This conduit 96 also communicates with a pressure regulator 214 that regulates the pressure at which the fuel is supplied to the fuel/air injectors by dumping excess fuel back to the fuel tank 208 through a return conduit 215. The direction of fuel flow through the system is identified by the arrows 216 in these figures.

The air supply system for supplying pressurized air to the air/fuel injectors 95 and specifically to the manifold 212 will now be described by particular reference to FIGS. 14, 16 and 17. As has been noted in the description of the engine, this includes an air supply conduit 97 that receives compressed air from an air compressor 217 that is mounted at the end of the engine opposite the transmission 198 and which is driven from the engine crankshaft by a serpentine drive belt 218. The crankshaft has a pulley 219 that is affixed to it in a known manner and which drives the drive belt 218. This drive belt 218 passes over a belt tensioner 222 and drives additional accessories as will be noted. The air compressor 217 draws the-air from the plenum chamber 201 through a conduit 223 that includes a silencing chamber 224.

The air/fuel manifold 212 and specifically the air conduit 96 also communicates with the pressure regulator 214 that maintains a predetermined pressure differential between the regulated fuel pressure and the regulated air pressure (the fuel pressure being higher). The air pressure is regulated by dumping excess air from the regulator 214 into the exhaust system, to be described, through a conduit 225.

Figure 13:
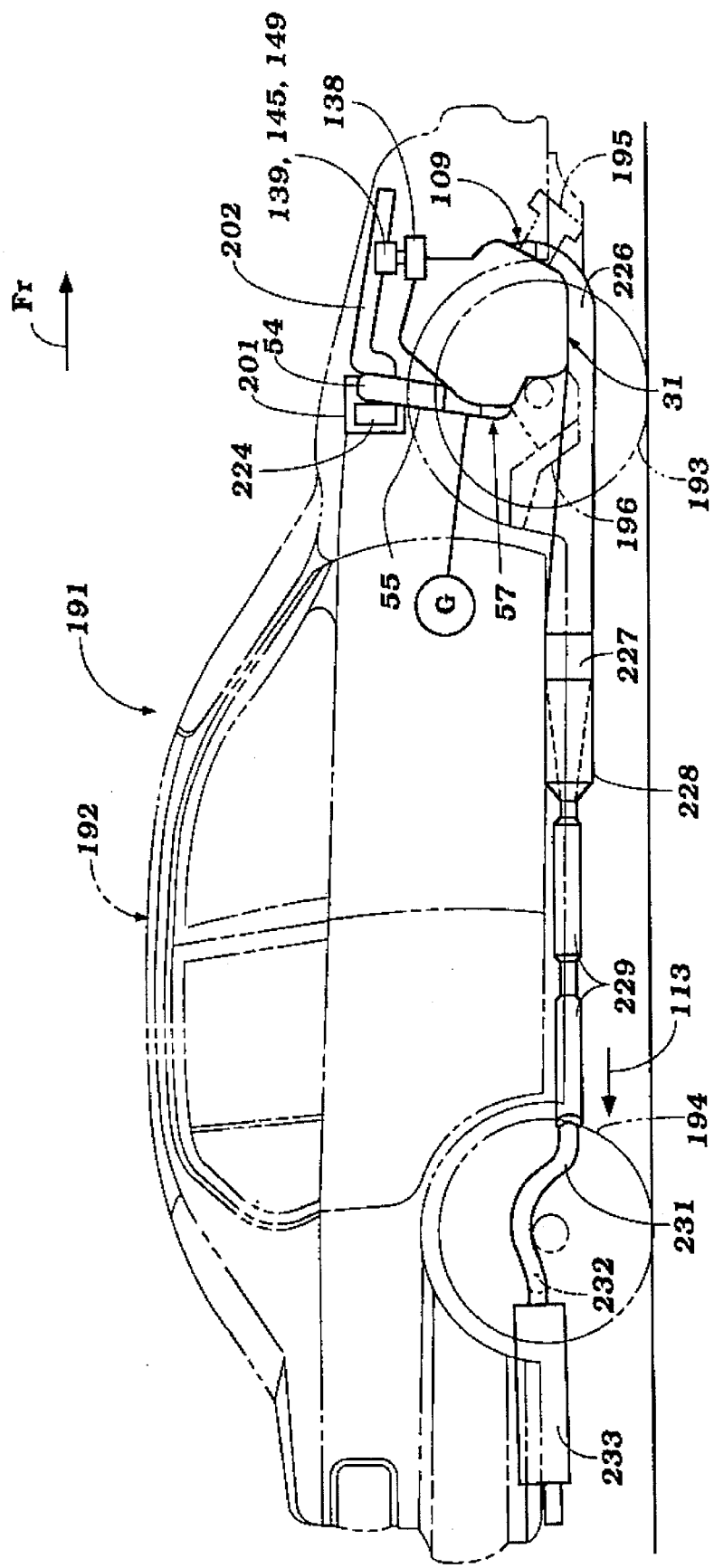
FIG. 13 is a side elevational view of the engine of FIG. 1–12 and its supporting axillaries as installed in a motor vehicle, which vehicle is shown in phantom.

The remainder of the exhaust system for the engine 31 will now be described by reference to FIGS. 13 and 14. This exhaust system, as previously noted, included the exhaust manifold 109. The exhaust manifold discharges into an exhaust pipe 226 which extends from the front of the engine 31 and runs beneath it to a catalytic converter 227. The catalytic converter 227 is formed as the forward portion of a first muffler 228. The first muffler 228 discharges to a pair of mufflers 229 which, in turn, discharge to a tail pipe 231. A branch pipe 232 intersects the tail pipe 231 where the tail pipe 231 discharges into a final muffler 233 that then delivers the exhaust gases to the atmosphere.

A temperature probe extends in to the catalyst 228 and provides a signal to a gauge 234 that is positioned in the operator's compartment of the vehicle.

As has been noted, the engine 31 is liquid cooled and the cooling jackets 133 and 134 for the engine were described in the portion of this specification dealing with the engine. However, it was noted that the manner in which the coolant was circulated through the engine would be described and that description will now be made by particular reference to FIGS. 18–20. The engine is provided with a combined water pump, thermostat assembly 235 which is driven by the engine in any known manner and which circulates coolant through a discharge line 236 to a heat exchanger or radiator 237. The coolant then returns to the water pump, thermostat assembly 235 through a return line 238. Coolant is delivered to the engine through a coolant supply line 239 and into the engine block through a fitting 241 with the direction of the coolant flow to the engine being identified by the reference numeral 242.

Figure 17:
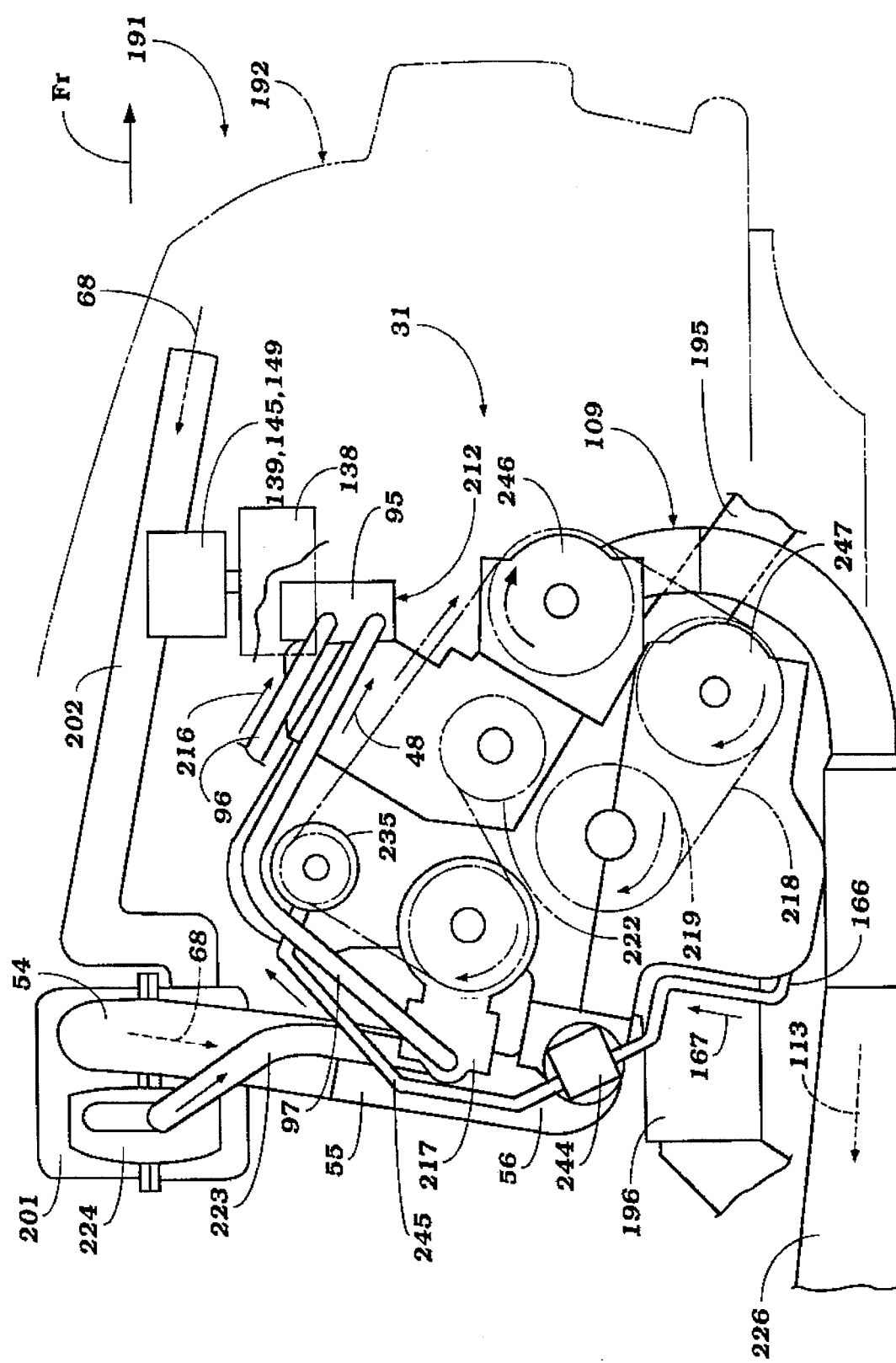
FIG. 17 is an enlarged side view of the front of the vehicle looking in the same direction as FIG. 13.
Figure 18:
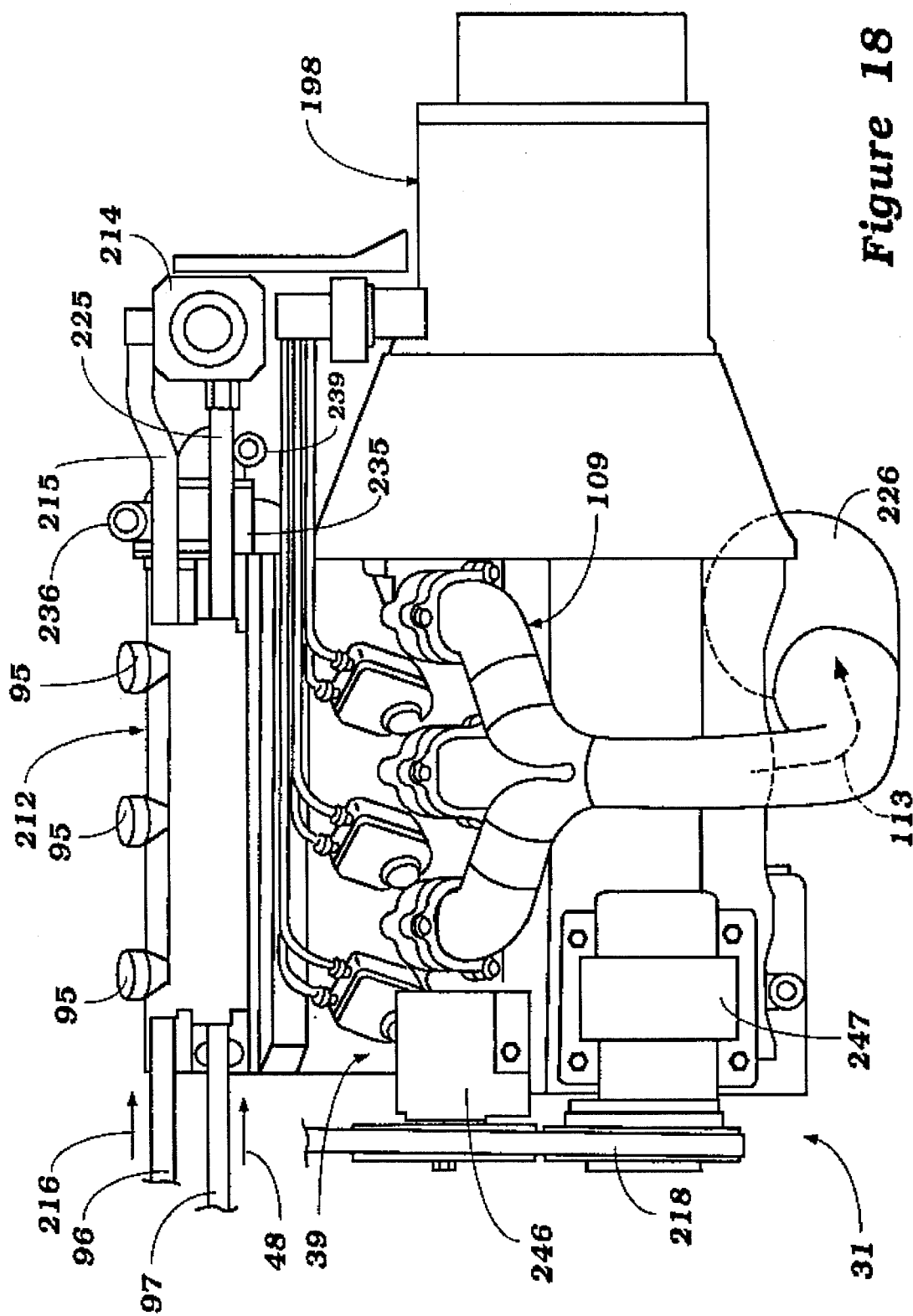
FIG. 18 is an enlarged front elevational view of the engine and the accessories which are visible from the front of the vehicle.
Figure 19:
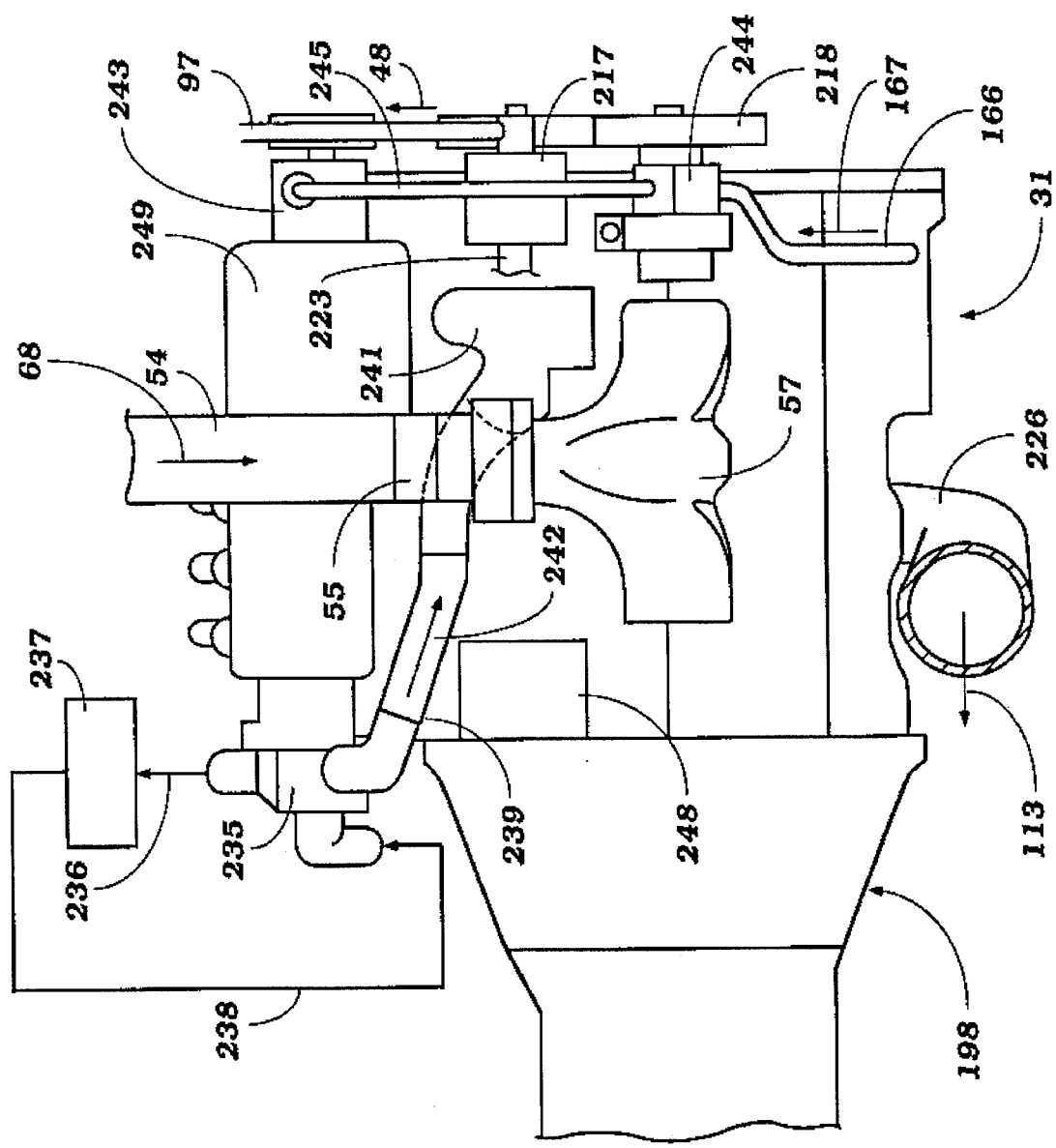
FIG. 19 is a rear elevational view of the engine and its supporting accessories.
Figure 20:
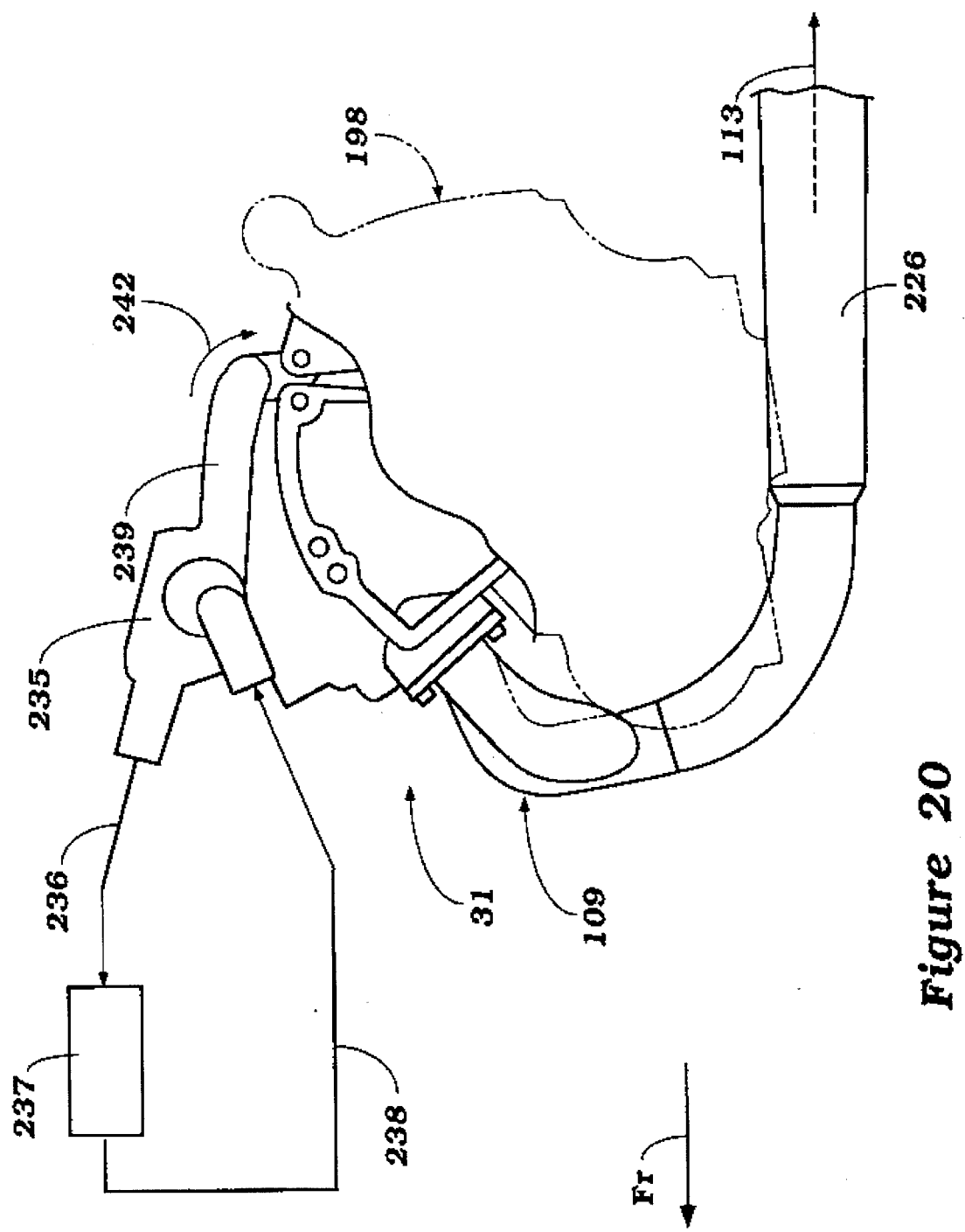
FIG. 20 is a side elevational view of the engine with certain components being broken away and other components being shown schematically and looking in the direction opposite to FIG. 17.

As has been previously noted, a vacuum pump is driven from the engine and this vacuum pump and the components associated with it may be best understood by reference to FIGS. 17 and 19. The vacuum pump is indicated generally by the reference numeral 243 and is driven by the drive belt 218. The vacuum is generated to provide a source of vacuum for the power braking system of the vehicle inasmuch as the engine 31 does not itself provide adequate induction system vacuum for the brake booster. The air is drawn from the brake booster by the vacuum pump 243 and is discharged to the atmosphere through the oil separator 171 previously described in conjunction with the description of the engine and illustrated in FIG. 12.

As has been noted, the vacuum pump 243 is lubricated from the lubricant in the sump 165 of the transmission 118. As has been previously noted, this lubricant is drawn through the conduit 166 and is drawn by an oil pump 244 which is driven from the engine through a suitable belt or other drive (not shown). The oil pump 244 then delivers the oil to the vacuum pump 243 through a pressure line 245.

The air which is pumped from the brake booster by the vacuum pump 243 is returned through the aforenoted conduit 168 (FIG. 12) to the oil separator 171 as previously described and then discharged to the atmosphere through the outlet 188.

Two remaining accessories are driven from the drive belt 218 and these appear in certain of these figures and are provided for operating other components of the vehicle. These components appear also in FIG. 17 and comprise a power steering pump 246 and an air conditioning compressor 247.

The vehicle and specifically the engine 31 is also provided with an electric starter 248 (FIG. 19) of any type which cooperates with the flywheel 199 in a known manner for engine starting.

Finally, the electrical system also includes a alternator or generator 249 that is driven off the rear of the vacuum pump 243 from the drive belt 218 for charging the battery of the vehicle and providing other electrical power.

Figure 21:
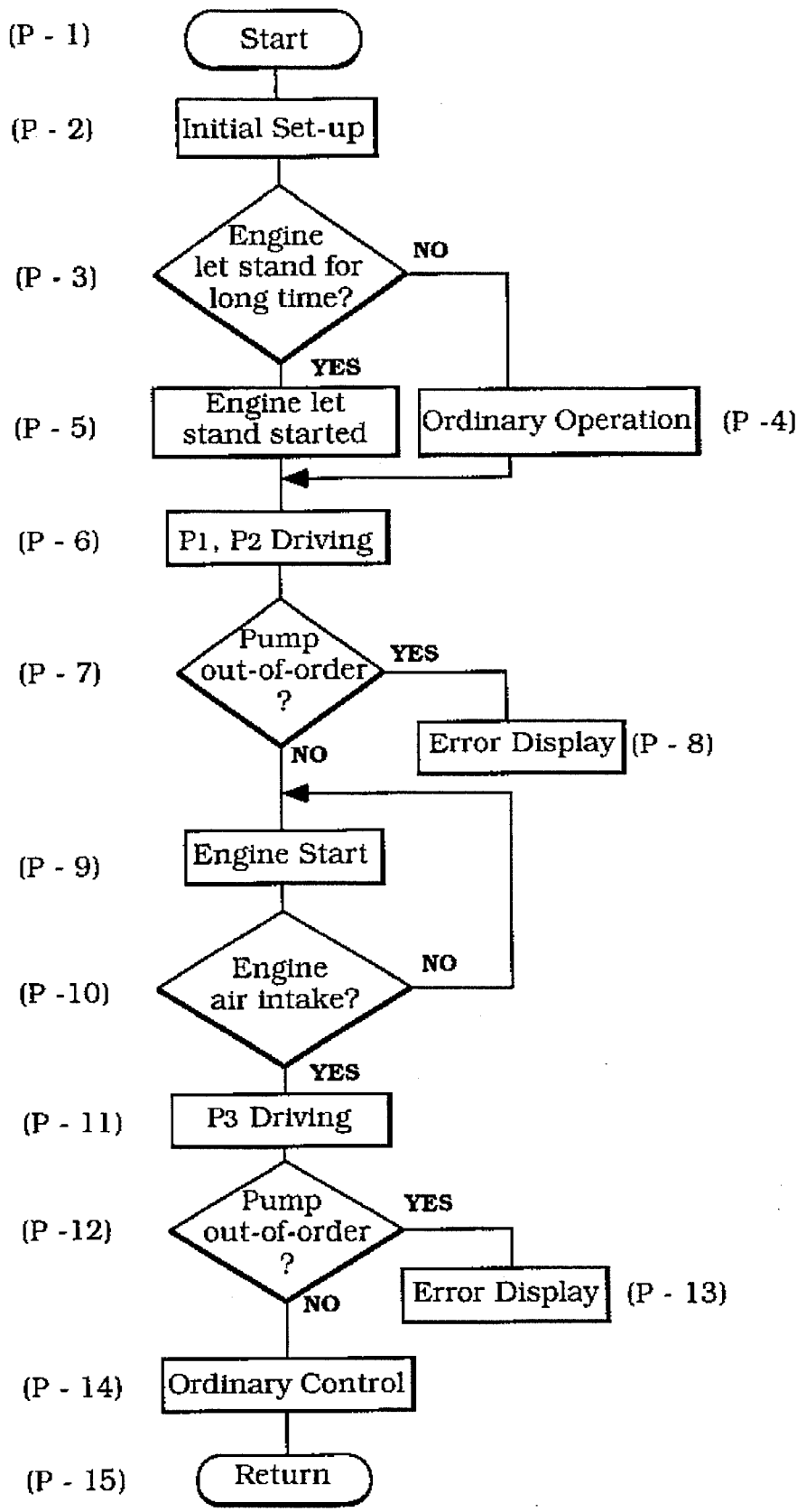
FIG. 21 is a block diagram showing the control routine for operation of the lubrication system.
Figure 22:
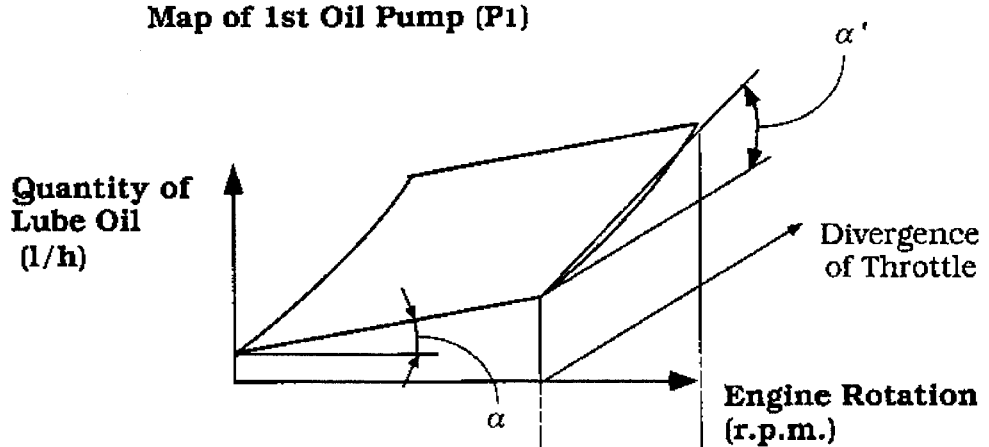
FIG. 22 is a graphical view showing the three-dimensional maps of the lubricant supply of the oil pumps.
Figure 22:
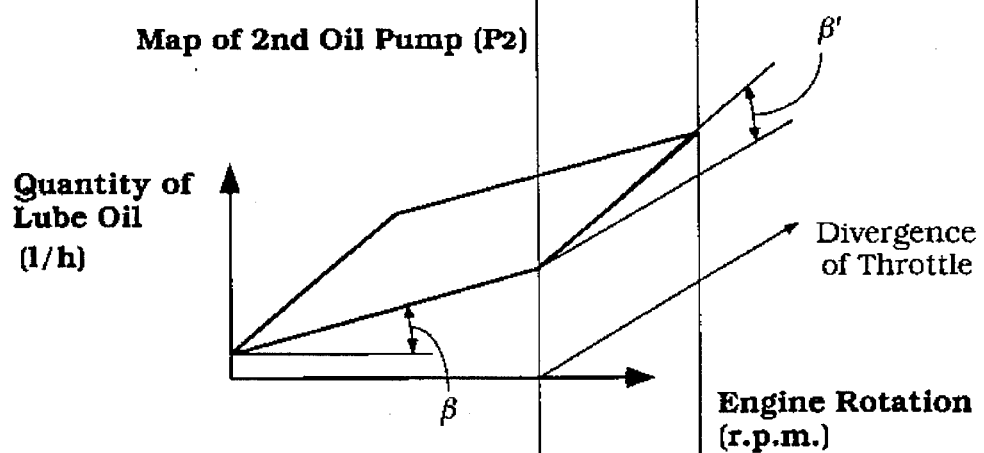
Figure 22:
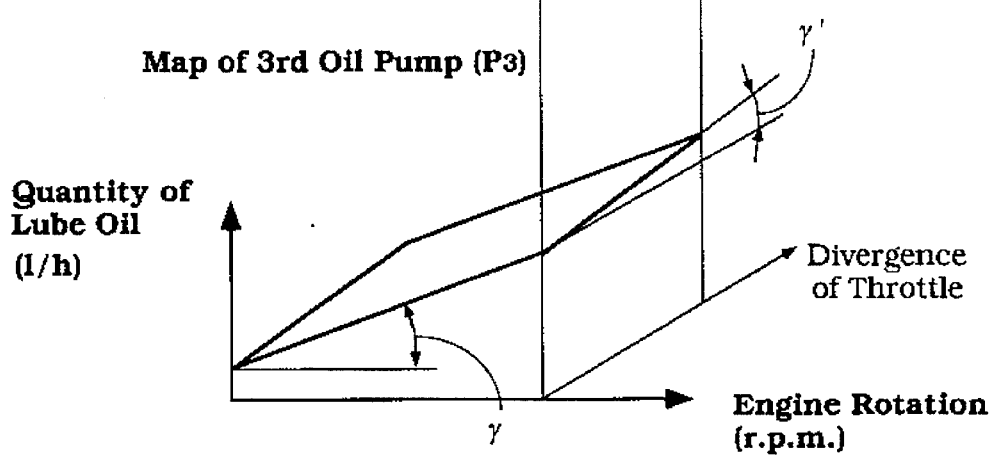

Lubricant Control System (FIGS. 21 and 22)

As has been noted, the control of the lubricant for the systems 135, 136 and 137 may be of any type that controls the amount of lubricant delivered by the pumps 139, 145 and 149 in response to sensed engine parameters. However, a portion of the control routine is shown in FIG. 21 and this shows the start up routine for operating the pumps 139, 145 and 149 checking them and then returning to normal control of the lubricant amount once the engine has started.

Referring to this figure, at the first step P-1 the program starts and moves to the step P-2 to determine the turning on of the main switch for operating the engine 31.

The program then moves to the step P-3 to determine if the engine has been left standing for a long time period. This is done by determining the time interval between when the engine was last shut off and when the main switch is again turned on. The reason that this check is done is that if the engine has not been running for a short period of time, then the supply of large amounts of lubricant to the engine during cranking may not be required. If the engine has not been standing for a long time, the program moves to the step P-4 so as to continue on with ordinary operation this may include operating at least the pumps 139 and 145 for a few cycles before starting as will be seen by the description of the normal operation beginning at step P-6.

If, however, at the step P-3 it has been determined that the engine has stood for a long period of time, the program moves to the step P-5 so as to immediately start the operation of the pumps 139, 145, and the pump 149, although this pump may be delayed from the other two, so as to ensure that there will be adequate lubrication before the engine is cranked.

Regardless of which of the routines of P-4 or P-5 are followed, the program then moves to the step P-6 to initiate operation of the pumps 139 and 145 which lubricate the sliding surfaces of the pistons 34 and cylinder bores 33 and also the bearing surfaces of the crankshaft 38.

The program then moves to the step P-7 to check to see that the pumps 139 and 145 are operating. This may be done by checking the pressure gauges 142 and 148 to ensure that pressure is being generated. If a pump is not out of order, the program moves to the step P-8 to display the error and warn the operator. If desired, a shutdown of the engine may be accomplished at this time so as to prevent starting until the error is rectified or the system is reset.

If, at the step P-7 it is determined that the pumps 139 and 145 are operating properly, the program moves to the step P-9 so as to permit starting of the engine.

The program then moves to the step P-10 to determine if the engine is running and this is accomplished by checking the pressure in the intake manifold 57 via a pressure gauge 251 (FIG. 1). If it is determined that there is not sufficient engine vacuum to indicate that the engine is running, the program repeats.

If, however, at the step P-10 it is determined that there is flow in the intake passage, then the pump 149 is started so that lubricant will be delivered to the induction system now that the engine is running. Any lubricant delivered before this time will merely collect in the intake manifold and cause smoke upon start-up.

The program then moves to the step P-11 to ensure that the pump 149 is operating and again this may be done by checking the pressure gauge 152 (FIG. 1) indicates a pressure is being generated. If the pump is not operating, the program moves to the step P-13 and provide the error display. Again, any form of warning may be accomplished and engine shutdown may also be initiated if the pump 149 is not operating properly.

Assuming at the step P-12 the pump 149 is determined to be fully operative, the program moves to the step P-14 to provide ordinary control for the amount of lubricant. The program then moves to the step P-15 and repeats.

As has been noted, the amount of lubricant supplied depends upon engine running conditions and a map is preprogrammed into the ECU 143 so as to determine the amount of lubricant for certain conditions with typical three-dimensional maps being illustrated in FIG. 22. These three-dimensional maps indicate the output of one of the cylinder bore lubricating oil pumps 139, one of the crankshaft bearing lubricating oil pumps 145 and the indirect lubrication pump 149. It is to be understood that a different curve will exist for each cylinder. The curves show the amount of lubricant in liters per hour for varying engine speeds and throttle openings or loads.

It should be readily apparent from the foregoing description that the engine 31 and its various accessories are laid out in such a way as to facilitate installation in a transverse orientation for a front wheel drive motor vehicle. In addition, by canting the engine slightly in a forward direction, all necessary components of the engine and its auxiliaries can be easily accessed for servicing and the lubrication of some of these components and the return of lubricant back to a lubricant reservoir formed at the lower portion of the engine is facilitated. Of course, the foregoing description is that of a preferred embodiment of the invention and various changes and modifications may be made without departing from the spirit and scope of the invention, as defined by the appended claims.

I claim:

1. A motor vehicle having a body assembly defining an engine compartment at the forward end thereof, a pair of front wheels suspended from said body assembly at the front thereof, a pair of rear wheels suspended from said body assembly at the rear end thereof, a multi-cylinder, in-line, two-cycle crankcase compression, internal combustion engine supported with a crankshaft rotatable about an axis extending transversely across said engine compartment and within said engine compartment, a balancer shaft driven by said engine crankshaft and rotatable about a balancer shaft axis parallel to and beneath said crankshaft axis, said engine having a plurality of exhaust ports on the side of said engine to the front of said engine compartment, an exhaust manifold for collecting exhaust gases from said exhaust ports, and an exhaust system including an exhaust pipe extending from said exhaust manifold beneath said engine and said balancer shaft rearwardly of said body assembly for discharge of the exhaust gases from said engine to the atmosphere.

2. The motor vehicle as set forth in claim 1, wherein the engine has a cylinder block in which the cylinder bores are formed and which cylinder bores are inclined from the vertical in a forward direction.

3. The motor vehicle as set forth in claim 2, wherein the forward inclination of the engine places the balancer shaft axis to the rear of and below the crankshaft axis.

4. The motor vehicle as set forth in claim 3, wherein the crankshaft is rotatable and journalled within a crankcase chamber and further including an oil separator disposed on the rear side of the engine to the rear of the crankcase chamber.

5. The motor vehicle as set forth in claim 4, further including an air pump driven by the engine and positioned on the rear end thereof and disposed vertically above the oil separator.

6. The motor vehicle as set forth in claim 5, further including lubricating means for supplying lubricant to the air pump and drain means for draining the lubricant by gravity from the air pump to the oil separator.

7. The motor vehicle as set forth in claim 6, further including an alternator driven by the engine crankshaft and positioned on the rear side of the engine.

8. The motor vehicle as set forth in claim 7, wherein the alternator is driven from the air pump.

9. The motor vehicle as set forth in claim 8, further including a starter motor mounted on the rear side of the engine for cooperation with the crankshaft for starting of said engine.

10. The motor vehicle as set forth in claim 1, wherein the crankshaft is rotatable and journalled within a crankcase chamber and further including an oil separator disposed on the rear side of the engine to the rear of the crankcase chamber.

11. The motor vehicle as set forth in claim 10, further including an air pump driven by the engine and positioned on the rear end thereof and disposed vertically above the oil separator.

12. The motor vehicle as set forth in claim 11, further including lubricating means for supplying lubricant to the air pump and drain means for draining the lubricant by gravity from the air pump to the oil separator.

13. The motor vehicle as set forth in claim 12, further including an alternator driven by the engine crankshaft and positioned on the rear side of the engine.

14. The motor vehicle as set forth in claim 13, wherein the alternator is driven from the air pump.

15. The motor vehicle as set forth in claim 1, further including an alternator driven by the engine crankshaft and positioned on the rear side of the engine.

16. The motor vehicle as set forth in claim 15, wherein the engine has a cylinder block in which cylinder bores are formed and which cylinder bores are inclined from the vertical in a forward direction.

17. The motor vehicle as set forth in claim 1, wherein the rear side of the engine is provided with a plurality of intake ports and further including an induction system for delivering at least an air charge to said intake ports.

18. The motor vehicle as set forth in claim 17, wherein the induction system includes an air silencer disposed to the rear of the engine within the engine compartment and receiving air from a ram air inlet extending forwardly in the engine compartment over the engine and terminating at the front end of said engine compartment.

19. The motor vehicle as set forth in claim 18, further including an air pump driven by the engine and positioned on the rear side thereof.

20. The motor vehicle as set forth in claim 19, wherein the air pump draws air from the air silencer.

21. The motor vehicle as set forth in claim 20, wherein the engine has a cylinder block in which cylinder bores are formed and which cylinder bores are inclined from the vertical in a forward direction.

22. The motor vehicle as set forth in claim 21, further including a further air pump driven by the engine and wherein the first mentioned air pump supplies air to the engine for its operation and the further air pump draws air from a vacuum booster for a brake system of the vehicle.

23. The motor vehicle as set forth in claim 22, wherein the crankshaft is rotatable and journalled within a crankcase chamber and further including an oil separator disposed on the rear side of the engine to the rear of the crankcase chamber.

24. The motor vehicle as set forth in claim 23, further including means for delivering lubricant to the further air pump for its lubrication and returning its lubricant from the further air pump to the oil separator.

25. The motor vehicle as set forth in claim 24, wherein the oil separator is positioned vertically below the further air pump and the lubricant is returned to the separator by gravity.

* * * * *